US012574079B2

(12) United States Patent
Huang et al.

(10) Patent No.: US 12,574,079 B2
(45) Date of Patent: Mar. 10, 2026

(54) PRECODING MATRIX INDICATION METHOD, PRECODING MATRIX DETERMINATION METHOD, APPARATUSES AND MEDIUM

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 119 days.

(21) Appl. No.: 17/916,562

(22) PCT Filed: Apr. 1, 2021

(86) PCT No.: PCT/CN2021/084909
§ 371 (c)(1),
(2) Date: Sep. 30, 2022

(87) PCT Pub. No.: WO2021/197418
PCT Pub. Date: Oct. 7, 2021

(65) Prior Publication Data
US 2023/0155644 A1 May 18, 2023

(30) Foreign Application Priority Data
Apr. 3, 2020 (CN) .......................... 202010261473.2

(51) Int. Cl.
*H04L 1/02* (2006.01)
*H04B 7/0456* (2017.01)
*H04B 7/06* (2006.01)

(52) U.S. Cl.
CPC ......... *H04B 7/0456* (2013.01); *H04B 7/0639* (2013.01)

(58) Field of Classification Search
CPC ... H04B 7/0456; H04B 7/0639; H04B 7/0478
(Continued)

(56) References Cited

U.S. PATENT DOCUMENTS

| | | | |
|---|---|---|---|
| 2019/0089429 A1 | 3/2019 | Wei et al. | |
| 2019/0158205 A1 | 5/2019 | Sheng et al. | |

(Continued)

FOREIGN PATENT DOCUMENTS

| | | |
|---|---|---|
| CN | 108668368 A | 10/2018 |
| CN | 110324070 A | 10/2019 |

(Continued)

OTHER PUBLICATIONS

The Extended European Search Report for the corresponding European Patent Application No. 21781923.4 issued by the European Patent Office on Aug. 28, 2023.

(Continued)

*Primary Examiner* — Helene E Tayong
(74) *Attorney, Agent, or Firm* — Ladas & Parry, LLP

(57) ABSTRACT

A precoding matrix indication method, a precoding matrix determination method, apparatuses and a medium are provided. The precoding matrix indication method includes: determining, by a network side, a set of sub-band precoding matrices, the set of sub-band precoding matrices being a sub-set in an uplink codebook of an uplink signal; determining sub-band information of precoding matrix indication information of the uplink signal in accordance with the set of sub-band precoding matrices, the sub-band information being used to indicate a sub-band precoding matrix that corresponds to each sub-band and is in the set of sub-band precoding matrices; transmitting the precoding matrix indi-
(Continued)

determining, by a network side, a set of sub-band precoding matrices, the set of sub-band precoding matrices being a sub-set in an uplink codebook of an uplink signal — 101 determining sub-band information of precoding matrix indication information of the uplink signal in accordance with the set of sub-band precoding matrices, the sub-band information being used to indicate a sub-band precoding matrix that corresponds to each sub-band and is in the set of sub-band precoding matrices — 102 transmitting the precoding matrix indication information including the sub-band information to a UE — 103 cation information including the sub-band information to a UE. The UE determines the sub-band precoding matrix corresponding to each sub-band in the set of sub-band precoding matrices in accordance with the sub-band information.

19 Claims, 2 Drawing Sheets

(58) Field of Classification Search
USPC ......................................................... 375/267
See application file for complete search history.

(56) References Cited

U.S. PATENT DOCUMENTS

| | | | |
|---|---|---|---|
| 2020/0022120 A1* | 1/2020 | Liu ...................... | H04B 7/0473 |
| 2020/0099423 A1 | 3/2020 | Ren et al. | |
| 2021/0160913 A1 | 5/2021 | Jiang et al. | |
| 2021/0167835 A1 | 6/2021 | Wang et al. | |

FOREIGN PATENT DOCUMENTS

| | | |
|---|---|---|
| CN | 110830092 A | 2/2020 |
| WO | 2018202154 A1 | 11/2018 |

OTHER PUBLICATIONS

"Remaining details on codebook based UL transmission," 3GPP TSG RAN WG1 Meeting 91, R1-1719527, Reno, USA, Nov. 27-Dec. 1, 2017. Source: ZTE, Sanchips, Agenda Item: 7.2.1.2, all pages.

International Search Report for PCT/CN2021/084909 issued on Jun. 30, 2021 and its English Translation provided by WIPO.

Written Opinion for PCT/CN2021/084909 issued on Jun. 30, 2021 and its English Translation provided by WIPO.

International Report on Patentibily for PCT/CN2021/084909issued on Sep. 29, 2022 and its English translation provided by WIPO.

"Remaining details on codebook based UL transmission," 3GPP TSG RAN WG1 Meeting 91, R1-1719527, Reno, USA, Nov. 27-Dec. 1, 2017, Source: ZTE, Sanechips, Agenda Item: 7.2.1.2, all pages.

First Office Action for Taiwanese Patent Application 110112157 issued on Nov. 30, 2021 and English translation provided by applicant's foreign counsel.

"Email discussion summary for RAN4#94e_#16_NR_eMIMO_UE_RF," R4-20xxxxx Electronic Meeting, Feb. 24-Mar.6, 2020, Agenda item: 8.11.1, Source: Moderator (Samsung), all pages.

"3rd Generation Partnership Project; Technical Specification Group Radio Access Network; NR, Physical layer procedures for data (release 16)," 2019-12, 3GPP TS 38.214 V16.0.0, all pages.

* cited by examiner

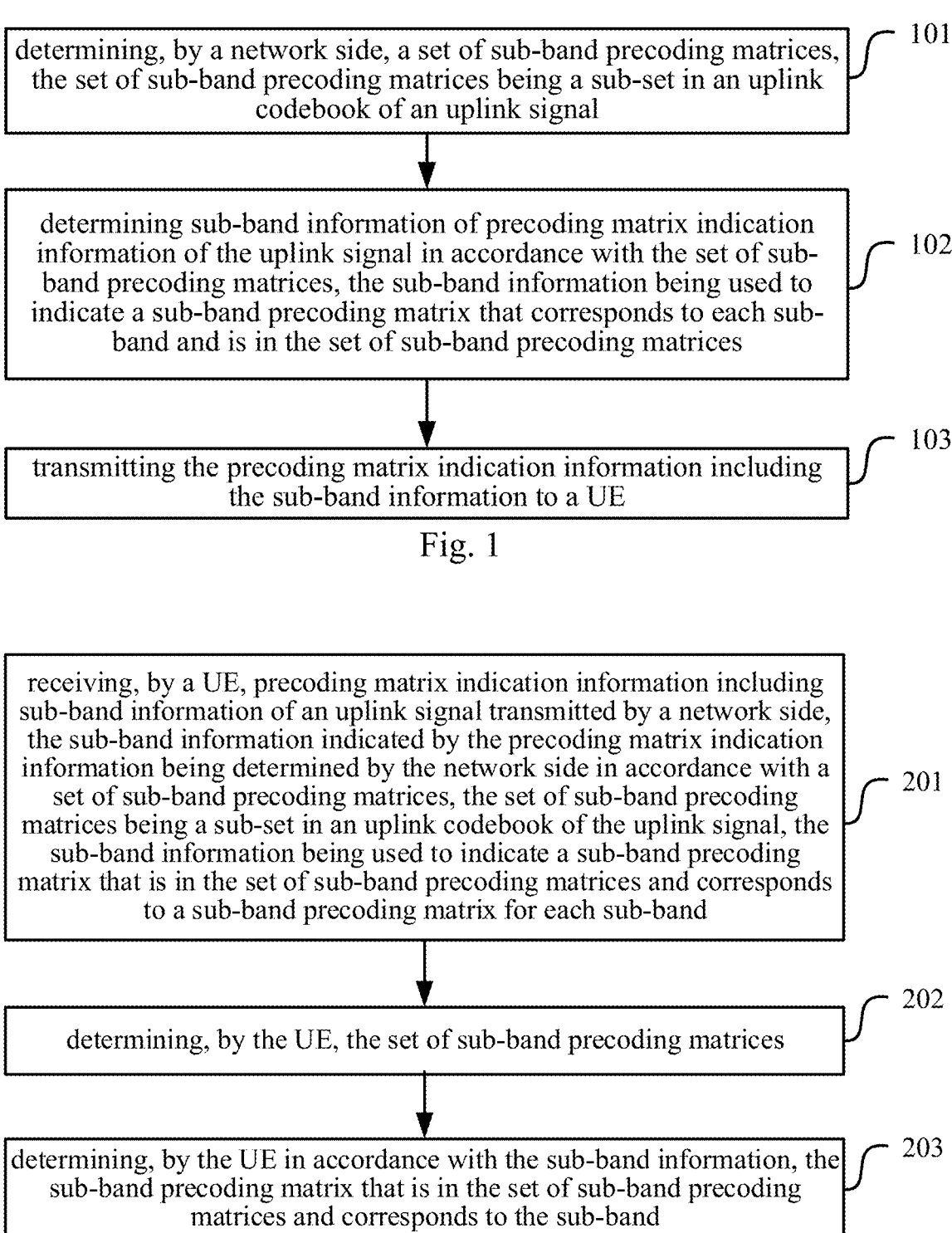

determining, by a network side, a set of sub-band precoding matrices, the set of sub-band precoding matrices being a sub-set in an uplink codebook of an uplink signal ⟋ 101 determining sub-band information of precoding matrix indication information of the uplink signal in accordance with the set of sub-band precoding matrices, the sub-band information being used to indicate a sub-band precoding matrix that corresponds to each sub-band and is in the set of sub-band precoding matrices ⟋ 102 transmitting the precoding matrix indication information including the sub-band information to a UE ⟋ 103

Fig. 1 receiving, by a UE, precoding matrix indication information including sub-band information of an uplink signal transmitted by a network side, the sub-band information indicated by the precoding matrix indication information being determined by the network side in accordance with a set of sub-band precoding matrices, the set of sub-band precoding matrices being a sub-set in an uplink codebook of the uplink signal, the sub-band information being used to indicate a sub-band precoding matrix that is in the set of sub-band precoding matrices and corresponds to a sub-band precoding matrix for each sub-band ⟋ 201 determining, by the UE, the set of sub-band precoding matrices ⟋ 202 determining, by the UE in accordance with the sub-band information, the sub-band precoding matrix that is in the set of sub-band precoding matrices and corresponds to the sub-band ⟋ 203

Fig. 2

PRECODING MATRIX INDICATION METHOD, PRECODING MATRIX DETERMINATION METHOD, APPARATUSES AND MEDIUM

CROSS-REFERENCE TO RELATED APPLICATIONS

This application is the U.S. national phase of PCT Application No.PCT/CN2021/084909 filed on Apr. 1, 2021, which claims a priority of to the Chinese patent application No.202010261473.2 filed in China on Apr. 3, 2020, the disclosures of which are incorporated herein by reference in their entireties.

TECHNICAL FIELD

The present disclosure relates to the field of wireless communication technology, in particular to a precoding matrix indication method, a precoding matrix determination method, apparatuses and a medium.

BACKGROUND

In a wireless communication system in the related art, e.g., a Long Term Evolution (LTE) system or a New Radio (NR) system, merely wideband precoding is supported in the Multiple Input Multiple Output (MIMO) transmission of an uplink signal.

For example, in a codebook-based Physical Uplink Shared Channel (PUSCH) uplink transmission scheme, a base station is merely capable of indicating, to a User Equipment (UE), a Sounding Reference Signal (SRS) resource (e.g., through a Radio Resource Control (RRC) signaling srs-ResourceIndicator or an SRS resource indicator field in Downlink Control Information (DCI)), a Transmission Precoder Matrix Index (TPMI) and the quantity of transmission streams (e.g., through RRC signaling precodingAndNumberOfLayers or a field of precoding information and number of layers in the DCI) for a wideband. During the transmission of the PUSCH, the UE uses same analog beam-forming, a same precoding matrix and the same number of transmission streams on all scheduled frequency-domain resources (the precoding matrix and the number of transmission streams are determined in accordance with the TPMI and the number of transmission streams for the wideband indicated by the base station).

For another example, in a non-codebook-based PUSCH uplink transmission scheme, the base station indicates, to the UE, an SRS Resource Indicator (SRI) for one wideband (e.g., through RRC signaling srs-ResourceIndicator or an SRS resource indicator field in the DCI). During the transmission of the PUSCH, the UE uses same analog beam-forming, a same precoding matrix and the same number of transmission streams on all the scheduled frequency-domain resources (the precoding matrix and the number of transmission streams are determined in accordance with the SRI indicated by the base station).

However, in the related art, the base station is merely capable of indicating the wideband precoding for the uplink signal.

SUMMARY

An object of the present disclosure is to provide a precoding matrix indication method, a precoding matrix determination method, apparatuses and a medium, so as to solve the problem in the related art where it is impossible indicate sub-band and wideband precoding for the uplink signal.

In one aspect, the present disclosure provides in some embodiments a precoding matrix indication method, including: determining, by a network side, a set of sub-band precoding matrices, the set of sub-band precoding matrices being a sub-set in an uplink codebook of an uplink signal; determining sub-band information of precoding matrix indication information of the uplink signal in accordance with the set of sub-band precoding matrices, the sub-band information being used to indicate a sub-band precoding matrix that corresponds to each sub-band and is in the set of sub-band precoding matrices; and transmitting the precoding matrix indication information including the sub-band information to a UE.

In a possible embodiment of the present disclosure, the set of sub-band precoding matrices is a sub-set selected from the uplink codebook of the uplink signal in accordance with one or more of a codebook sub-set constraint, the number of transmission streams, a full power transmission mode of the uplink signal, the number of antenna ports of each precoding matrix, or a coherent transmission capability of the UE.

In a possible embodiment of the present disclosure, the set of sub-band precoding matrices meets one or more of the following conditions: that the sub-band precoding matrices have the same number of non-zero antenna ports; that the sub-band precoding matrices have completely same non-zero antenna ports; that first M antenna ports of the sub-band precoding matrices have a same relative phase relation; or that the non-zero antenna ports of the sub-band precoding matrices have same positions.

In a possible embodiment of the present disclosure, M is a value determined in advance, agreed through a protocol, indicated by the network side to the UE, or determined in accordance with a pre-agreed rule.

In a possible embodiment of the present disclosure, M is half of the number of antenna ports included in an SRS resource for determining transmission information of the uplink signal, and/or the uplink signal is a signal of a PUSCH and M has a different value when the number of antenna ports corresponding to the PUSCH is different.

In a possible embodiment of the present disclosure, the precoding matrix indication method further includes transmitting, by the network side, a method for determining the set of sub-band precoding matrices to the UE, to instruct the UE to determine the set of sub-band precoding matrices in accordance with the method.

In a possible embodiment of the present disclosure, the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports selected from the uplink codebook; or the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports and the number of transmission streams selected from the uplink codebook. The precoding matrix indication method further includes transmitting, by the network side, the number of non-zero antenna ports to the UE.

In a possible embodiment of the present disclosure, an indication overhead of the sub-band information is a function of the number of all possible sub-band precoding matrices in the set of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

In a possible embodiment of the present disclosure, the sub-band information indicated by the precoding matrix indication information includes sub-band information of a sub-band whose sub-band information has not been indicated, and/or sub-band information of a sub-band whose sub-band precoding matrix has already been invalid.

In a possible embodiment of the present disclosure, the precoding matrix indication information further includes wideband information for the sub-band precoding matrix for each sub-band.

In a possible embodiment of the present disclosure, the wideband information is determined by the network side in accordance with the set of sub-band precoding matrices.

In a possible embodiment of the present disclosure, the wideband information includes indication information of the SRS resource and/or indication information of the number of transmission streams.

In a possible embodiment of the present disclosure, when the wideband information includes the indication information of the number of transmission streams, the set of sub-band precoding matrices is a set of sub-band precoding matrices corresponding to the number of transmission streams indicated by the wideband information.

In a possible embodiment of the present disclosure, the precoding matrix indication method further includes performing joint encoding on the wideband information and the sub-band information.

In a possible embodiment of the present disclosure, the joint encoding is performed on the wideband information and the sub-band information through one or more of: carrying the wideband information in sub-band information of one sub-band; determining, by the network side, sub-band information of one sub-band, and determining sub-band information of another sub-band in accordance with the wideband information and the sub-band information of the sub-band; or agreeing, by the network side with a UE side, sub-band information of one sub-band, and determining sub-band information of another sub-band in accordance with the wideband information and the sub-band information of the sub-band.

In a possible embodiments of the present disclosure, an indication overhead of the wideband information is a function of the number of all possible sets of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

In a possible embodiment of the present disclosure, the selected number of transmission streams is the number of transmission streams indicated by the network side and available for the UE during the uplink transmission.

In another aspect, the present disclosure provides in some embodiments a precoding matrix determination method, including: receiving, by a UE, precoding matrix indication information including sub-band information of an uplink signal transmitted by a network side, the sub-band information indicated by the precoding matrix indication information being determined by the network side in accordance with a set of sub-band precoding matrices, the set of sub-band precoding matrices being a sub-set in an uplink codebook of the uplink signal, the sub-band information being used to indicate a sub-band precoding matrix that corresponds to each sub-band and is in the set of sub-band precoding matrices; determining, by the UE, the set of sub-band precoding matrices; and determining, by the UE in accordance with the sub-band information, the sub-band precoding matrix that is in the set of sub-band precoding matrices and corresponds to the sub-band.

In a possible embodiment of the present disclosure, the set of sub-band precoding matrices is determined from sub-sets selected from the uplink codebook of the uplink signal in accordance with one or more of a codebook sub-set constraint, the number of transmission streams, a full power transmission mode of the uplink signal, the number of antenna ports of each precoding matrix, or a coherent transmission capability of the UE.

In a possible embodiment of the present disclosure, the set of sub-band precoding matrices is determined in accordance with one or more of the following conditions: that the sub-band precoding matrices have the same number of non-zero antenna ports; that the sub-band precoding matrices have completely same non-zero antenna ports; that first $M$ antenna ports of the sub-band precoding matrices have a same relative phase relation; or that the non-zero antenna ports of the sub-band precoding matrices have same positions.

In a possible embodiment of the present disclosure, $M$ is a value determined in advance, agreed through a protocol, indicated by the network side to the UE, or determined in accordance with a pre-agreed rule.

In a possible embodiment of the present disclosure, $M$ is half of the number of antenna ports included in an SRS resource for determining transmission information of the uplink signal, and/or the uplink signal is a signal of a PUSCH and $M$ has a different value when the number of antenna ports corresponding to the PUSCH is different.

In a possible embodiment of the present disclosure, the precoding matrix determination method further includes receiving, by the UE, a method for determining the set of sub-band precoding matrices transmitted by the network side, and determining the set of sub-band precoding matrices in accordance with the method.

In a possible embodiment of the present disclosure, the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports selected from the uplink codebook; or the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports and the number of transmission streams selected from the uplink codebook. The precoding matrix determination method further includes receiving, by the UE, the number of non-zero antenna ports from the network side.

In a possible embodiment of the present disclosure, an indication overhead of the sub-band information is determined by the UE, and the indication overhead is a function of the number of all possible sub-band precoding matrices in the set of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

In a possible embodiment of the present disclosure, the sub-band information indicated by the precoding matrix indication information includes sub-band information of a sub-band whose sub-band information has not been indicated, and/or sub-band information of a sub-band whose sub-band precoding matrix has already been invalid.

In a possible embodiment of the present disclosure, the precoding matrix indication information further includes wideband information for the sub-band precoding matrix for each sub-band.

In a possible embodiment of the present disclosure, the set of sub-band precoding matrices is determined by the UE in accordance with the wideband information.

In a possible embodiment of the present disclosure, the wideband information includes indication information of the SRS resource and/or indication information of the number of transmission streams.

In a possible embodiment of the present disclosure, when the wideband information includes the indication information of the number of transmission streams, the set of sub-band precoding matrices is a set of sub-band precoding matrices corresponding to the number of transmission streams indicated by the wideband information.

In a possible embodiment of the present disclosure, the precoding matrix determination method further includes, when joint encoding is performed on the wideband information and the sub-band information, determining the wideband information and the sub-band information through one or more of: determining the wideband information in sub-band information of one sub-band; determining sub-band information of one sub-band, and determining sub-band information of another sub-band in accordance with the wideband information; or agreeing, by a UE side with the network side, sub-band information of one sub-band, and determining sub-band information of another sub-band in accordance with the wideband information.

In a possible embodiment of the present disclosure, an indication overhead of the wideband information is determined by the UE, and the indication overhead is a function of the number of all possible sets of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

In a possible embodiment of the present disclosure, the selected number of transmission streams is the number of transmission streams indicated by the network side and available for the UE during the uplink transmission.

In yet another aspect, the present disclosure provides in some embodiments a base station, including a processor and a transceiver. The processor is configured to read a program in a memory, so as to: determine a set of sub-band precoding matrices, the set of sub-band precoding matrices being a sub-set in an uplink codebook of an uplink signal; determine sub-band information of precoding matrix indication information of the uplink signal in accordance with the set of sub-band precoding matrices, the sub-band information being used to indicate a sub-band precoding matrix that corresponds to each sub-band and is in the set of sub-band precoding matrices; and transmit the precoding matrix indication information including the sub-band information to a UE. The transceiver is configured to receive and transmit data under the control of the processor.

In a possible embodiment of the present disclosure, the set of sub-band precoding matrices is a sub-set selected from the uplink codebook of the uplink signal in accordance with one or more of a codebook sub-set constraint, the number of transmission streams, a full power transmission mode of the uplink signal, the number of antenna ports of each precoding matrix, or a coherent transmission capability of the UE.

In a possible embodiment of the present disclosure, the set of sub-band precoding matrices meets one or more of the following conditions: that the sub-band precoding matrices have the same number of non-zero antenna ports; that the sub-band precoding matrices have completely same non-zero antenna ports; that first M antenna ports of the sub-band precoding matrices have a same relative phase relation; or that the non-zero antenna ports of the sub-band precoding matrices have same positions.

In a possible embodiment of the present disclosure, M is a value determined in advance, agreed through a protocol, indicated by the network side to the UE, or determined in accordance with a pre-agreed rule.

In a possible embodiment of the present disclosure, M is half of the number of antenna ports included in an SRS resource for determining transmission information of the uplink signal, and/or the uplink signal is a signal of a PUSCH and M has a different value when the number of antenna ports corresponding to the PUSCH is different.

In a possible embodiment of the present disclosure, the processor is further configured to read the program in the memory, so as to transmit a method for determining the set of sub-band precoding matrices to the UE, thereby to indicate the UE to determine the set of sub-band precoding matrices in accordance with the method.

In a possible embodiment of the present disclosure, the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports selected from the uplink codebook; or the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports and the number of transmission streams selected from the uplink codebook. The processor is further configured to read the program in the memory, so as to indicate the number of non-zero antenna ports to the UE.

In a possible embodiment of the present disclosure, an indication overhead of the sub-band information is a function of the number of all possible sub-band precoding matrices in the set of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

In a possible embodiment of the present disclosure, the sub-band information indicated by the precoding matrix indication information includes sub-band information of a sub-band whose sub-band information has not been indicated, and/or sub-band information of a sub-band whose sub-band precoding matrix has already been invalid.

In a possible embodiment of the present disclosure, the precoding matrix indication information further includes wideband information for the sub-band precoding matrix for each sub-band.

In a possible embodiment of the present disclosure, the wideband information is determined by the network side in accordance with the set of sub-band precoding matrices.

In a possible embodiment of the present disclosure, the wideband information includes indication information of the SRS resource and/or indication information of the number of transmission streams.

In a possible embodiment of the present disclosure, when the wideband information includes the indication information of the number of transmission streams, the set of sub-band precoding matrices is a set of sub-band precoding matrices corresponding to the number of transmission streams indicated by the wideband information.

In a possible embodiment of the present disclosure, the processor is further configured to read the program in the memory, so as to perform joint encoding on the wideband information and the sub-band information.

In a possible embodiment of the present disclosure, the joint encoding is performed on the wideband information and the sub-band information through one or more of: carrying the wideband information in sub-band information of one sub-band; determining, by the base station, sub-band information of one sub-band, and determining sub-band information of another sub-band in accordance with the wideband information and the sub-band information of the sub-band; or agreeing, by the base station with a UE side, sub-band information of one sub-band, and determining sub-band information of another sub-band in accordance with the wideband information and the sub-band information of the sub-band.

In a possible embodiments of the present disclosure, an indication overhead of the wideband information is a function of the number of all possible sets of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

In a possible embodiment of the present disclosure, the selected number of transmission streams is the number of transmission streams indicated by the network side and available for the UE during the uplink transmission.

In still yet another aspect, the present disclosure provides in some embodiments a UE, including a processor and a transceiver. The processor is configured to read a program in a memory, so as to: receive precoding matrix indication information including sub-band information of an uplink signal transmitted by a network side, the sub-band information indicated by the precoding matrix indication information being determined by the network side in accordance with a set of sub-band precoding matrices, the set of sub-band precoding matrices being a sub-set in an uplink codebook of the uplink signal, the sub-band information being used to indicate a sub-band precoding matrix that corresponds to each sub-band and is in the set of sub-band precoding matrices; determine the set of sub-band precoding matrices; and determine a sub-band precoding matrix for each sub-band in the set of sub-band precoding matrices in accordance with the sub-band information. The transceiver is configured to receive and transmit data under the control of the processor.

In a possible embodiment of the present disclosure, the set of sub-band precoding matrices is determined from sub-sets selected from the uplink codebook of the uplink signal in accordance with one or more of a codebook sub-set constraint, the number of transmission streams, a full power transmission mode of the uplink signal, the number of antenna ports of each precoding matrix, or a coherent transmission capability of the UE.

In a possible embodiment of the present disclosure, the set of sub-band precoding matrices is determined in accordance with one or more of the following conditions: that the sub-band precoding matrices have the same number of non-zero antenna ports; that the sub-band precoding matrices have completely same non-zero antenna ports; that first M antenna ports of the sub-band precoding matrices have a same relative phase relation; or that the non-zero antenna ports of the sub-band precoding matrices have same positions.

In a possible embodiment of the present disclosure, M is a value determined in advance, agreed through a protocol, indicated by the network side to the UE, or determined in accordance with a pre-agreed rule.

In a possible embodiment of the present disclosure, M is half of the number of antenna ports included in an SRS resource for determining transmission information of the uplink signal, and/or the uplink signal is a signal of a PUSCH and M has a different value when the number of antenna ports corresponding to the PUSCH is different.

In a possible embodiment of the present disclosure, the processor is further configured to read the program in the memory, so as to receive a method for determining the set of sub-band precoding matrices transmitted by the network side, and determine the set of sub-band precoding matrices in accordance with the method.

In a possible embodiment of the present disclosure, the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports selected from the uplink codebook; or the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports and the number of transmission streams selected from the uplink codebook. The processor is further configured to read the program in the memory, so as to receive the number of non-zero antenna ports from the network side.

In a possible embodiment of the present disclosure, an indication overhead of the sub-band information is determined by the UE, and the indication overhead is a function of the number of all possible sub-band precoding matrices in the set of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

In a possible embodiment of the present disclosure, the sub-band information indicated by the precoding matrix indication information includes sub-band information of a sub-band whose sub-band information has not been indicated, and/or sub-band information of a sub-band whose sub-band precoding matrix has already been invalid.

In a possible embodiment of the present disclosure, the precoding matrix indication information further includes wideband information for the sub-band precoding matrix for each sub-band.

In a possible embodiment of the present disclosure, the set of sub-band precoding matrices is determined by the UE in accordance with the wideband information.

In a possible embodiment of the present disclosure, the wideband information includes indication information of the SRS resource and/or indication information of the number of transmission streams.

In a possible embodiment of the present disclosure, when the wideband information includes the indication information of the number of transmission streams, the set of sub-band precoding matrices is a set of sub-band precoding matrices corresponding to the number of transmission streams indicated by the wideband information.

In a possible embodiment of the present disclosure, the processor is further configured to read the program in the memory, so as to, when joint encoding is performed on the wideband information and the sub-band information, determine the wideband information and the sub-band information through one or more of: determining the wideband information in sub-band information of one sub-band; determining sub-band information of one sub-band, and determining sub-band information of another sub-band in accordance with the wideband information; or agreeing, by a UE side with the network side, sub-band information of one sub-band, and determining sub-band information of another sub-band in accordance with the wideband information.

In a possible embodiment of the present disclosure, an indication overhead of the wideband information is determined by the UE, and the indication overhead is a function of the number of all possible sets of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

In a possible embodiment of the present disclosure, the selected number of transmission streams is the number of transmission streams indicated by the network side and available for the UE during the uplink transmission.

In still yet another aspect, the present disclosure provides in some embodiments a precoding matrix indication apparatus, including: a set determination module configured to determine a set of sub-band precoding matrices, the set of sub-band precoding matrices being a sub-set in an uplink codebook of an uplink signal; a sub-band determination module configured to determine sub-band information of precoding matrix indication information of the uplink signal in accordance with the set of sub-band precoding matrices, the sub-band information being used to indicate a sub-band precoding matrix that corresponds to each sub-band and is in the set of sub-band precoding matrices; and a transmission module configured to transmit the precoding matrix indication information including the sub-band information to a UE.

In still yet another aspect, the present disclosure provides in some embodiments a precoding matrix determination apparatus, including: a reception module configured to receive precoding matrix indication information including sub-band information of an uplink signal transmitted by a network side, the sub-band information indicated by the precoding matrix indication information being determined by the network side in accordance with a set of sub-band precoding matrices, the set of sub-band precoding matrices being a sub-set in an uplink codebook of the uplink signal, the sub-band information being used to indicate a sub-band precoding matrix that corresponds to each sub-band and is in the set of sub-band precoding matrices; a UE set determination module configured to determine the set of sub-band precoding matrices; and a UE sub-band determination module configured to determine a sub-band precoding matrix for each sub-band in the set of sub-band precoding matrices in accordance with the sub-band information.

In still yet another aspect, the present disclosure provides in some embodiments a computer-readable storage medium storing therein a computer program for implementing the above-mentioned precoding matrix indication method and/or the above-mentioned precoding matrix determination method.

The present disclosure has the following beneficial effects.

According to the embodiments of the present disclosure, the network side determines a sub-set in the uplink codebook of the uplink signal as the set of sub-band precoding matrices, and then determines the sub-band information of the precoding matrix indication information of the uplink signal in accordance with the set of sub-band precoding matrices. The sub-band information is used to indicate the respective sub-band precoding matrix that corresponds to each sub-band and is in the set of sub-band precoding matrices. As a result, upon the receipt of the precoding matrix indication information including the sub-band information, it is able for the UE to determine the sub-band precoding matrix used by the sub-band, thereby to solve the problem in the related art where the sub-band precoding matrix is not indicated.

In addition, in the related art, the sub-band precoding matrix for each sub-band is indicated in the uplink codebook. In other words, when the uplink codebook includes 64 precoding matrices, each piece of sub-band precoding matrix indication information needs to have 6 bits. However, in the embodiments of the present disclosure, the sub-band precoding matrix is indicated through one sub-set in the uplink codebook (a set of sub-band precoding matrices), i.e., the sub-band precoding matrix is indicated through a set of less than 64 precoding matrices, so it is able to reduce the overhead. For example, when a sub-set merely includes 4 precoding matrices, the overhead for each sub-band precoding matrix merely needs to have 2 bits. As a result, it is able to reduce the overhead for the indication of the sub-band precoding matrix.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. In these drawings, FIG. 1 is a flow chart of a precoding matrix indication method at a base station side according to an embodiment of the present disclosure;

FIG. 2 is a flow chart of a precoding matrix determination method at a UE side according to an embodiment of the present disclosure;

DETAILED DESCRIPTION

Figure 3:
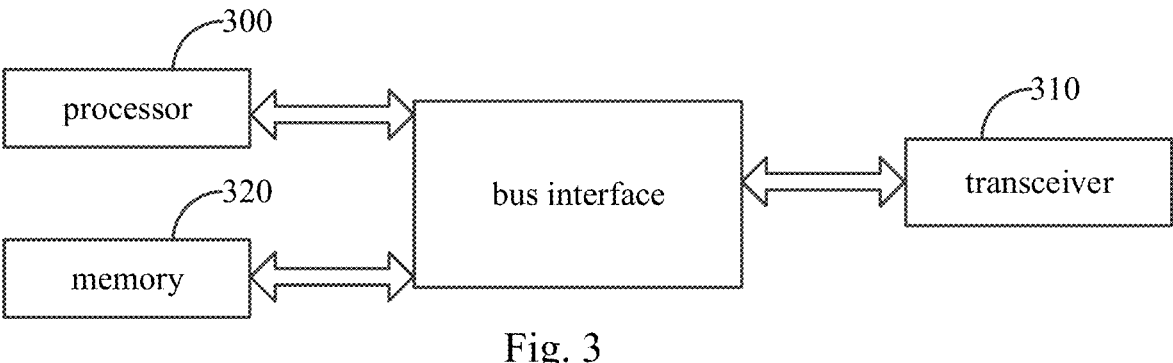
FIG. 3 is a schematic view showing a base station according to an embodiment of the present disclosure.

It is found through researches that, in a wireless communication system of the related art, e.g., an LTE system or an NR system, wideband precoding rather than sub-band precoding is supported in the MIMO transmission of an uplink signal.

Through the sub-band precoding, it is able to provide a frequency selective precoding gain, thereby to improve the transmission performance of the uplink signal. There possibly exist the two modes for indicating a sub-band precoding matrix, i.e., Alt 1: indicating to a UE, through DCI, a sub-band TPMI of a Physical Resource Block (PRB) allocated through uplink scheduling, and Alt 2: indicating to the UE, through the DCI, sub-band TPMIs of all PRBs for uplink transmission.

However, in the related art, there is no specific scheme about how to indicate, by a base station, the frequency selective precoding (also called as sub-band precoding) for the uplink signal and how to determine, by the UE, the precoding of the uplink signal during the transmission of the frequency selective precoding.

Based on the above, an object of the present disclosure is to provide a scheme for indicating the sub-band precoding matrix, which will be described hereinafter in conjunction with the drawings and embodiments.

The scheme will be described from a UE side and a base station side, and then an instance of the scheme at both the UE side and the base station will be given so as to facilitate the understanding of the scheme. However, it does not mean that the scheme must be implemented cooperatively or individually. Actually, when the scheme is implemented by the UE or the base station, it is also able solve the problem at the UE side or the base station side. It should be noted, when the scheme is adopted by both the UE and the base station, it is able to achieve a better technical effect.

At first, a wideband and a sub-band will be described hereinafter.

The wideband corresponds to all frequency-domain resources allocated for an uplink signal, and wideband information is information adapted to all resources scheduled for the uplink signal. Taking precoding matrix indication information as an example, when a network side device indicates the precoding matrix indication information of one wideband to the UE, a precoding matrix indicated through the information is used for all the frequency-domain resources for the uplink signal. In the embodiments of the present disclosure, the wideband precoding refers to that a same precoding matrix is used by all the frequency-domain resources for the uplink signal.

One sub-band includes N consecutive PRBs or N consecutive Virtual Resource Blocks (VRBs), and it refers to a part of the frequency-domain resources allocated for the uplink signal.

A size of the sub-band and/or a division mode of the sub-band are indicated by the network side device to the UE through signaling (e.g., the network side device indicates a value of N to the UE directly or in any other ways), or are pre-agreed through a protocol. Sub-band information of different sub-bands may be the same or different. The network side device indicates the respective sub-band information with respect to each sub-band. For example, when the number of transmission streams is the bandwidth information, all resources scheduled for the uplink signal may use the number of transmission streams. Information related to a sub-band is also called as sub-band information, and it is information of the sub-band scheduled for the uplink signal. The sub-band information of one sub-band is information adapted to the sub-band.

Still taking the precoding matrix indication information as an example, when the network side device indicates to the UE the precoding matrix indication information of a certain sub-band, a precoding matrix indicated through the information is used for frequency-domain resources for the uplink signal corresponding to the sub-band. In the embodiments of the present disclosure, the sub-band precoding refers to that the precoding matrices are used by the uplink signal at different sub-bands, i.e., the precoding matrices used at the sub-bands may be the same or different. In other words, the network side device may indicate the respective precoding matrix for each sub-band, instead that all the frequency-domain resources for the uplink signal use a same precoding matrix.

In a possible embodiment of the present disclosure, the network side device indicates precoding granularity of the uplink signal to the UE, and a level of the precoding granularity of the uplink signal corresponds to the size of the sub-band. The network side device or the UE determines each sub-band for the uplink signal in accordance with the precoding granularity.

The frequency-domain resources allocated for the uplink signal are divided into some sub-bands in accordance with the precoding granularity.

As shown in FIG. 1, the present disclosure provides in some embodiments a precoding matrix indication method at a base station side, which includes: Step 101 of determining, by a network side, a set of sub-band precoding matrices, the set of sub-band precoding matrices being a sub-set in an uplink codebook of an uplink signal; Step 102 of determining sub-band information of precoding matrix indication information of the uplink signal in accordance with the set of sub-band precoding matrices, the sub-band information being used to indicate a sub-band precoding matrix that corresponds to each sub-band and is in the set of sub-band precoding matrices; and Step 103 of transmitting the precoding matrix indication information including the sub-band information to a UE.

As shown in FIG. 2, the present disclosure further provides in some embodiments a precoding matrix determination method at a UE side, which includes: Step 201 of receiving, by a UE, precoding matrix indication information including sub-band information of an uplink signal transmitted by a network side, the sub-band information indicated by the precoding matrix indication information being determined by the network side in accordance with a set of sub-band precoding matrices, the set of sub-band precoding matrices being a sub-set in an uplink codebook of the uplink signal, the sub-band information being used to indicate a sub-band precoding matrix that corresponds to each sub-band and is in the set of sub-band precoding matrices; Step 202 of determining, by the UE, the set of sub-band precoding matrices; and Step 203 of determining, by the UE in accordance with the sub-band information, the sub-band precoding matrix that is in the set of sub-band precoding matrices and corresponds to the sub-band.

During the implementation, an order of Step 201 and Step 202 will not be particularly defined herein.

The scheme may be applied to, but not limited to, an NR system, an LTE system, a $6^{th}$-Generation (6G) system, or an evolved system thereof.

The following description will be given mainly taking a signal of a PUSCH as an example. It should be noted, the uplink signal includes, but not limited to, the signal of a PUSCH, a Demodulation Reference Signal (DMRS), a Physical Uplink Control Channel (PUCCH), a Physical Random Access Channel (PRACH) and an SRS.

In the embodiments of the present disclosure, the network side determines the set of sub-band precoding matrices, determines the sub-band information of the precoding matrix indication information of the uplink signal in accordance with the set of sub-band precoding matrices, and transmits the precoding matrix indication information including the sub-band information to the UE, so that the UE determines the sub-band precoding matrix for the uplink signal at each sub-band.

Each sub-band corresponds to a respective one sub-band precoding matrix.

The set of sub-band precoding matrices is a sub-set in the uplink codebook of the uplink signal.

The precoding matrix indication information includes the sub-band information, and the sub-band information is information with respect to each sub-band, and a position where the sub-band information is carried is called as a sub-band part. To be specific, the sub-band precoding matrix in the set of sub-band precoding matrices corresponding to the sub-band precoding matrix for each sub-band is determined in accordance with the sub-band information.

In other words, the set of sub-band precoding matrices is a sub-set in the uplink codebook of the uplink signal, and the information carried at the sub-band part is sub-band information used to indicate the precoding matrix in the set of sub-band precoding matrices. The sub-band part includes one or more indication values, and when the sub-band part includes a plurality of indication values, any two of them are used to indicate the precoding matrices for the uplink signal at different sub-bands.

When there is a plurality of sub-bands for the uplink signal, the sub-band information merely indicates the precoding matrices at a part of sub-bands.

The indication information of the sub-band precoding matrices includes a plurality of parts or parameters, e.g., a wideband part and a sub-band part. The wideband part is used to indicate the wideband information, i.e., the information adapted to all the sub-bands. The sub-band part is used to indicate the sub-band information merely adapted to a part of the sub-bands rather than all the sub-bands. For example, three sub-bands are scheduled for the uplink signal, the sub-band part includes three sub-band precoding matrix indicators for indicating precoding matrices at first, second and third sub-bands respectively. In other words, the precoding matrix indication information further includes the wideband information, a position where the wideband information is carried is called as wideband part, and the wideband information is information with respect to all the sub-bands.

The wideband part and the sub-band part are indicated at the same time or at different time points. The wideband part is used to indicate a set of precoding matrices and the number of transmission streams corresponding to the sub-band part.

When the sub-band precoding (also called as frequency selective precoding, i.e., there is a plurality of frequency-domain parts in a system, the network side indicates a precoding matrix for each frequency-domain part, and the precoding matrices corresponding to different frequency-domain parts are the same or different) is performed on the uplink signal, for one sub-band, the network side indicate one precoding matrix in a set consisting of a part of precoding matrices in the uplink codebook (i.e., the set of sub-band precoding matrices). The set of sub-band precoding matrices is different from a codebook sub-set corresponding to current codebook sub-set constraint signaling (e.g., a codebook sub-set corresponding to a codebook sub-set constraint in a $3^{rd}$ Generation Partnership Project (3GPP) protocol is a set of a part of or all of precoding matrices in the uplink codebook). The set of sub-band precoding matrices may be a sub-set further defined in the codebook sub-set corresponding to the codebook sub-set constraint signaling in the 3GPP protocol of the related art.

In the embodiments of the present disclosure, the uplink codebook (or the codebook sub-set corresponding to the codebook sub-set constraint signaling in the protocol) is divided into a plurality of sets of sub-band precoding matrices, which will be described hereinafter.

The sub-band part will be described hereinafter at first.

The sub-band part includes an indication value, or it includes a plurality of indication values, and any two indication values are used to indicate the precoding matrix for the uplink signal at different sub-bands. Different indication values correspond to different sub-bands.

During the implementation, the set of sub-band precoding matrices is a sub-set selected from the uplink codebook of the uplink signal in accordance with one or more of the following parameters: a codebook sub-set constraint, the number of transmission streams, a full power transmission mode of the uplink signal, the number of antenna ports of each precoding matrix, or a coherent transmission capability of the UE.

In the embodiments of the present disclosure, for ease of differentiation, the above parameter is called as a first parameter.

During the implementation, the set of sub-band precoding matrices meets one or more of the following conditions: that the sub-band precoding matrices have the same number of non-zero antenna ports; that the sub-band precoding matrices have completely same non-zero antenna ports; that first M antenna ports of the sub-band precoding matrices have a same relative phase relation; or that the non-zero antenna ports of the sub-band precoding matrices have same positions.

In the embodiments of the present disclosure, for ease of differentiation, the above condition is called as a second condition.

During the implementation, as a feasible way, the sub-sets are firstly selected in accordance with the first parameter, and then a real sub-set is determined in accordance with the second condition.

When the first parameter is the codebook sub-set constraint signaling, and the first parameter is the codebook sub-set constraint signaling, the set of sub-band precoding matrices is a set of precoding matrices that is in the codebook sub-set corresponding to the signaling and satisfies the second condition.

When the first parameter is the codebook sub-set constraint signaling and the second condition is that the number of non-zero antenna ports is the same, the precoding matrices in the codebook sub-set are divided in accordance with the number of non-zero antenna ports. For example, the precoding matrices of which the number of non-zero antenna ports is 1 form one group (a first possible set of sub-band precoding matrices), the precoding matrices of which the number of non-zero antenna ports is 2 form one group (a second possible set of sub-band precoding matrices), and the precoding matrices of which the number of non-zero antenna ports is 4 form one group (a third possible set of sub-band precoding matrices).

It should be noted, the precoding matrices of which the number of non-zero antenna ports is X are further divided into a plurality of sets of sub-band precoding matrices. For example, the precoding matrices of which the number of non-zero antenna ports is 1 form one group (a first possible set of sub-band precoding matrices), the precoding matrices of which the number of non-zero antenna ports is 2 form two groups (a second possible set of sub-band precoding matrices and a third possible set of sub-band precoding matrices, and in the precoding matrices of which the number of non-zero antenna ports is 2, the precoding matrices having completely the same non-zero antenna ports form one group), and the precoding matrices of which the number of non-zero antenna ports is 4 form one group (a fourth possible set of sub-band precoding matrices). At this time, the first parameter is the codebook sub-set constraint signaling, and the second condition is that the number of non-zero antenna ports is the same and the non-zero antenna ports are completely the same.

When the UE is scheduled by the network side to transmit a PUSCH, a sub-band precoding matrix indicator of each sub-band is merely used to indicate a precoding matrix in one set of sub-band precoding matrices.

For example, the set of sub-band precoding matrices is a set of all precoding matrices having the same number of non-zero antenna ports corresponding to the number of antenna ports selected from the uplink codebook, a set of all precoding matrices having the same number of non-zero antenna ports corresponding to the number of antenna ports and the number of transmission streams selected from the uplink codebook, a set of all precoding matrices having completely the same non-zero antenna ports corresponding to the number of antenna ports selected from the uplink codebook, a set of all precoding matrices having completely the same non-zero antenna ports corresponding to the number of antenna ports and the number of transmission streams selected from the uplink codebook, a set of all precoding matrices having a same relative phase relationship among the first M antenna ports corresponding to the number of antenna ports selected from the uplink codebook, a set of all precoding matrices having a same relative phase relationship among the first M antenna ports corresponding to the number of antenna ports and the number of transmission streams selected from the uplink codebook, a set of all precoding matrices having the non-zero antenna ports at same positions (the non-zero antenna ports have a completely same position in the precoding matrices) corresponding to the number of antenna ports selected from the uplink codebook, a set of all precoding matrices having the non-zero antenna ports at same positions (the non-zero antenna ports have a completely same position in the precoding matrices) corresponding to the number of antenna ports and the number of transmission streams selected from the uplink codebook, a set of all precoding matrices having a same relative phase relationship among the first M antenna ports and a same relative phase relationship among last M antenna ports corresponding to the number of antenna ports selected from the uplink codebook, or a set of all precoding matrices having a same relative phase relationship among the first M antenna ports and a same relative phase relationship among the last M antenna ports corresponding to the number of antenna ports and the number of transmission streams selected from the uplink codebook.

During the implementation, M is a value determined in advance, agreed through a protocol, indicated by the network side to the UE, or determined in accordance with a pre-agreed rule.

During the implementation, M is half of the number of antenna ports included in an SRS resource for determining transmission information of the uplink signal, and/or the uplink signal is a signal of a PUSCH and M has a different value when the number of antenna ports corresponding to the PUSCH is different.

To be specific, M is a value determined in advance, a value agreed through a protocol, a value indicated by a base station to the UE, or a value determined in accordance with a pre-agreed rule.

M is half of the number of antenna ports in the SRS resource for determining the transmission information of the uplink signal. In other words, an SRS resource set for transmitting the uplink signal (e.g., for a codebook-based PUSCH, an SRS resource set where high-layer signaling usage is configured as codebook) includes merely one SRS resource, M is half of the number of antenna ports in the SRS resource. When the SRS resource set for transmitting the uplink signal includes a plurality of SRS resources, M is half of the number of antenna ports included in an SRS resource for transmitting the uplink signal and indicated by the base station (through an SRS indicator).

For example, during the 2-port PUSCH transmission, M is a pre-agreed value, and during the 4-port PUSCH transmission, M is another pre-agreed value.

During the implementation, the precoding matrix indication method further includes transmitting, by the network side, a method for determining the set of sub-band precoding matrices to the UE, to instruct the UE to determine the set of sub-band precoding matrices in accordance with the method.

To be specific, the UE supports a plurality of schemes for determining the set of sub-band precoding matrices, and the network side transmits indication information indicating a method for determining the set of sub-band precoding matrices to the UE.

During the implementation, when the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports selected from the uplink codebook; or the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports and the number of transmission streams selected from the uplink codebook, the precoding matrix indication method further includes transmitting, by the network side, the number of non-zero antenna ports to the UE.

To be specific, when the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports selected from the uplink codebook; or the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports and the number of transmission streams selected from the uplink codebook, the network side indicates the number of non-zero antenna ports to the UE.

During the implementation, usually the non-zero antenna port is an antenna port at non-zero power, and the non-zero antenna port of the precoding matrix is an antenna port corresponding to a non-zero element in the precoding matrix. When the precoding matrix is used for the mapping from the number of transmission streams to the antenna ports, the non-zero antenna port is an antenna port corresponding to the non-zero element in the precoding matrix. For example, a precoding matrix [1 0]T may be used for the mapping from a layer of data to two antenna ports, an antenna port corresponding to a non-zero element 1 in the precoding matrix is just a non-zero antenna port. When the precoding matrix is used for the mapping from an antenna port for a first signal to an antenna port for a second signal, the non-zero antenna port is an antenna port through which the second signal is transmitted at the non-zero power.

During the implementation, the sub-band part includes one or more pieces of sub-band precoding matrix indication information, and each piece of the sub-band precoding matrix indication information is used to indicate a precoding matrix for one sub-band.

In other words, the sub-band precoding matrix indicators may be used to indicate the sub-bands, and at least one indicator may be used to indicate one sub-band.

To be specific, the sub-band part of the precoding matrix indication information includes one more one pieces of sub-band precoding matrix indication information, each piece of sub-band precoding matrix indication information is used to indicate a precoding matrix for a respective one sub-band, and an overhead of each piece of sub-band precoding matrix indication information depends on the division mode of the sets of sub-band precoding matrices.

During the implementation, an indication overhead of the sub-band information is a function of the number of all possible sub-band precoding matrices in the set of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

For ease of differentiation, the above condition is called as a third condition.

To be specific, the sub-band part of the precoding matrix indication information includes one or more pieces of sub-band precoding matrix indication information, and each piece of sub-band precoding matrix indication information is used to indicate a precoding matrix for one sub-band.

The overhead of each piece of sub-band precoding matrix indication information is a function of the number of precoding matrices in all possible sets of sub-band precoding matrices under the third condition. For example, the overhead of each piece of sub-band precoding matrix indication information is a maximum value of the numbers of precoding matrices in all possible sets of sub-band precoding matrices under the given third condition. Presumed that the maximum value is N, a bitwidth of each sub-band precoding matrix indicator is log 2(⌈N⌉) bits, where ⌈ ⌉ represents a round-up operation. The overhead is also represented as payload or bitwidth. In a 3GPP standard, usually the bitwidth is used as the overhead.

The third condition is one or more of the selected codebook sub-band constraint, the selected number of transmission streams, the selected full power transmission mode of the uplink signal, the selected number of antenna ports, or the coherent transmission capability of the UE.

During the implementation, the selected number of transmission streams is the number of transmission streams indicated by the network side for the uplink signal.

The codebook sub-set constraint and the transmission streams are selected through a protocol, or selected by the base station in accordance with a predetermined rule.

To be specific, the overhead of the sub-band information is determined by the UE. This is because, in the related art, when the sub-band information is indicated through DCI, the UE needs to determine the overhead of the sub-band information and an overhead of the other information carried in the DCI, so as to determine an overhead of the DCI. Then, the UE performs blind detection on the DCI in accordance with the overhead of the DCI, so as to obtain information carried in the DCI.

The precoding matrix indication information further includes wideband information, and a position where the information is carried is called as a bandwidth part. The wideband information is information with respect to all sub-bands. The wideband part will be described hereinafter.

During the implementation, the precoding matrix indication information further includes the wideband information adapted to the sub-band precoding matrix for each sub-band.

To be specific, the precoding matrix indication information further includes the wideband part, and at this time, the wideband part is a part for determining the set of sub-band precoding matrices. The network side determines the wideband part for the precoding matrix indication information of the uplink signal in accordance with the set of sub-band precoding matrices.

During the implementation, the wideband information is determined by the network side in accordance with the set of sub-band precoding matrices.

To be specific, the network side determines the wideband part for the precoding matrix indication information of the uplink signal in accordance with the set of sub-band precoding matrices.

During the implementation, the wideband information includes indication information of the SRS resource and/or indication information of the number of transmission streams.

To be specific, the wideband part includes the indication information of the SRS resource and/or indication information of the number of transmission streams. When the wideband part includes the indication information of the number of transmission streams, the set of sub-band precoding matrices is a set of precoding matrices corresponding to the number of transmission streams indicated through the wideband part.

During the implementation, when the wideband information includes the indication information of the number of transmission beams, the set of sub-band precoding matrices is a set of sub-band precoding matrices corresponding to the number of transmission beams indicated through the wideband information.

To be specific, the wideband part includes the indication information of the SRS resource and/or indication information of the number of transmission streams. When the wideband part includes the indication information of the number of transmission streams, the set of sub-band precoding matrices is a set of precoding matrices corresponding to the number of transmission streams indicated through the wideband part.

During the implementation, the UE determines the set of sub-band precoding matrices in accordance with the wideband information.

To be specific, the wideband part is information purely used to indicate the set of sub-band precoding.

For example, there may be eight possible sets, the wideband part includes three bits, and each state indicates one set of sub-band precoding matrices.

The wideband part may also be any combination of the SRI, the indication information of the transmission streams and wideband precoding matrix indication information. Here, the wideband precoding matrix indication information is a part of or all of information for determining the set of sub-band precoding matrices.

During the implementation, the precoding matrix indication method further includes performing joint encoding on the wideband information and the sub-band information.

During the implementation, the joint encoding is performed on the wideband information and the sub-band information through one or more of: carrying the wideband information in sub-band information of one sub-band; determining, by the network side, sub-band information of one sub-band, and determining sub-band information of another sub-band in accordance with the wideband information and the sub-band information of the sub-band; or agreeing, by the network side with a UE side, sub-band information of one sub-band, and determining sub-band information of another sub-band in accordance with the wideband information and the sub-band information of the sub-band.

To be specific, the joint encoding is performed on the wideband part and the sub-band part. For example, a given sub-band precoding matrix indicator includes the wideband part, and the wideband information corresponding to the sub-band precoding matrices indicated through all the other sub-band precoding matrix indicators is determined through the wideband part indicated by the given sub-band precoding matrix indicator.

For another example, the given sub-band precoding matrix indicator is absolute sub-band precoding matrix indication information, i.e., the given sub-band precoding matrix is indicated from the entire uplink codebook. Alternatively, the given sub-band precoding matrix indicator is determined in a codebook sub-set defined by the base station for the UE, and it is any value in the codebook sub-set and determined by the base station. The other sub-band precoding matrix indicator is differential indication information, i.e., it is obtained in accordance with the given sub-band precoding matrix. For example, the other sub-band precoding matrix indicators are used to indicate a differential value of the given sub-band precoding matrix indicator.

The given sub-band precoding matrix is indicated by the base station to the UE, or pre-agreed by the base station and the UE (e.g., through a protocol).

During the implementation, it is presumed that there is a correspondence between the indication information and the sub-band, e.g., a first sub-band includes 4 bits, and a second sub-band and the subsequent sub-bands each includes 2 bits. The set of sub-band precoding matrices and a precoding matrix for the first sub-band are determined in accordance with the indication information corresponding to the first sub-band, and a precoding matrix for the other sub-band is determined in accordance with the set of sub-band precoding matrices in combination with the indication information corresponding to the other sub-band.

It should be noted, the precoding matrix for the first sub-band may be also determined in accordance with the indication information corresponding to the first sub-band, and due to the differential encoding, the precoding matrix for the other sub-band is determined in accordance with the precoding matrix for the first sub-band.

During the implementation, the sub-band information indicated through the precoding matrix indication information includes sub-band information of a sub-band whose sub-band information has not been indicated, and/or sub-band information of a sub-band whose sub-band precoding matrix has already been invalid.

To be specific, the wideband part is used to indicate information of the precoding matrix for the sub-band for which no sub-band precoding matrix has been indicated and/or the precoding matrix for the sub-band whose sub-band precoding matrix has already been invalid. For example, there exists a valid time window for the sub-band precoding matrix indicator, and when the valid time window has expired, it is considered that the sub-band precoding matrix indicated by the network side is invalid.

When the base station merely indicates the information of the precoding matrices for a part of sub-bands (rather than the information of the precoding matrices for all the sub-bands for the uplink signal), the precoding matrix indication information may merely indicate the information of the precoding matrix for the sub-band for which the precoding matrix has not been indicated by the base station, and/or the information of the precoding matrix for the sub-band for which the information of the precoding matrix has already been expired; or the precoding matrix indication information is merely used to indicate the information of the precoding matrix for the sub-band for which the precoding matrix is not indicated by the base station and where the uplink signal is located, and/or the information of the precoding matrix for the sub-band for which the information has already been expired and where the uplink signal is located.

During the implementation, an indication overhead of the wideband information is a function of the number of all possible sets of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

For ease of differentiation, the above condition is called as a fourth condition.

To be specific, the overhead of the wideband part is a function of the number of all possible sets of sub-band precoding matrices under the fourth condition. For example, the wideband part of the precoding matrix indication information has a bitwidth of $\log 2(\lceil P \rceil)$ bits, where P is the number of sets of sub-band precoding matrices.

The fourth condition is one or more of the selected codebook sub-band constraint, the selected number of transmission streams, the selected full power transmission mode of the uplink signal, the selected number of antenna ports, or the coherent transmission capability of the UE.

To be specific, under some special conditions, the wideband part of the precoding matrix indication information has a bitwidth of 0, i.e., there is the sub-band part rather than the wideband part. For example, for the UE configured with a "nonCoherent" codebook sub-set, the precoding matrix indication information merely includes the sub-band part rather than the wideband part.

During the implementation, the selected number of transmission beams is the number of transmission beams indicated by the network side and available for the UE during the uplink transmission.

To be specific, the selected number of transmission beams is the number of transmission beams indicated by the base station and available for the UE during the uplink transmission.

The codebook sub-set constraint and the number of transmission streams are selected through a protocol, or selected by the base station in accordance with a predetermined rule.

The following description will be given in conjunction with the embodiments.

First Embodiment

In this embodiment, for the selected number of transmission streams, the set of sub-band precoding matrices is a set of precoding matrices where the non-zero antenna ports are completely the same.

For example, when the number of transmission streams is 1 and the number of antenna ports is 2, the uplink codebook is divided into two sets of sub-band precoding matrices, i.e., $$\left\{ \frac{1}{\sqrt{2}}\begin{bmatrix}1\\0\end{bmatrix}, \frac{1}{\sqrt{2}}\begin{bmatrix}0\\1\end{bmatrix} \right\}, \text{ and} \qquad \text{set 1}$$

$$\left\{ \frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix} \right\}. \qquad \text{set 2}$$

When the base station indicates to the UE that the number of transmission streams is 1 and the number of non-zero antenna ports is 1, the set of sub-band precoding matrices is the set 1, and the base station indicates the precoding matrix for each sub-band in the set 1.

When the base station indicates to the UE that the number of transmission streams is 2 and the number of non-zero antenna ports is 1, the set of sub-band precoding matrices is the set 2, and the base station indicates the precoding matrix for each sub-band in the set 2.

For another example, when the number of transmission streams is 1 and the number of antenna ports is 4, the uplink codebook is divided into three sets of sub-band precoding matrices, i.e., $$\left\{ \frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}0\\0\\0\\1\end{bmatrix} \right\}, \qquad \text{set 4-1}$$

$$\left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix} \right\}, \qquad \text{set 4-2}$$

$$\left\{ \frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\-1\end{bmatrix}, \right. \qquad \text{set 4-3}$$

$$\left. \frac{1}{2}\begin{bmatrix}1\\j\\-1\\-j\end{bmatrix}, \frac{1}{2}\begin{bmatrix}1\\j\\-j\\1\end{bmatrix}, \frac{1}{2}\begin{bmatrix}1\\-1\\1\\-1\end{bmatrix}, \frac{1}{2}\begin{bmatrix}1\\-1\\j\\-j\end{bmatrix}, \frac{1}{2}\begin{bmatrix}1\\-1\\-1\\1\end{bmatrix}, \frac{1}{2}\begin{bmatrix}1\\-1\\-j\\j\end{bmatrix}, \right.$$

-continued $$\left. \frac{1}{2}\begin{bmatrix}1\\-j\\1\\-j\end{bmatrix}, \frac{1}{2}\begin{bmatrix}1\\-j\\j\\1\end{bmatrix}, \frac{1}{2}\begin{bmatrix}1\\-j\\-1\\j\end{bmatrix}, \frac{1}{2}\begin{bmatrix}1\\-j\\-j\\-1\end{bmatrix} \right\}.$$

When the base station indicates to the UE that the number of transmission streams is 1 and the number of non-zero antenna ports is 1, the set of sub-band precoding matrices is the set 1, and the base station indicates the precoding matrix for each sub-band in the set 1.

When the base station indicates to the UE that the number of transmission streams is 1 and the number of non-zero antenna ports is 2, the set of sub-band precoding matrices is the set 2, and the base station indicates the precoding matrix for each sub-band in the set 4-2.

When the base station indicates to the UE that the number of transmission streams is 1 and the number of non-zero antenna ports is 4, the set of sub-band precoding matrices is the set 2, and the base station indicates the precoding matrix for each sub-band in the set 4-3.

Second Embodiment

In this embodiment, for the selected number of transmission streams, the set of sub-band precoding matrices is a set of precoding matrices where the number of non-zero antenna ports is 2 and the non-zero antenna ports of the sub-band precoding matrices have a completely same position.

For example, the set of sub-band precoding matrices is a set of precoding matrices in Table 8.

For another example, the set of sub-band precoding matrices is a set of precoding matrices in Table 9.

Third Embodiment

In this embodiment, for the selected number of transmission streams, the set of sub-band precoding matrices is a set of precoding matrices where the number of non-zero antenna ports is 4 and the non-zero antenna ports of the sub-band precoding matrices have a completely same position.

For example, the set of sub-band precoding matrices is a set of precoding matrices in any of Tables 10, 11 and 12.

For another example, the set of sub-band precoding matrices is a set of precoding matrices in any of Tables 18, 19, 21 to 25.

Fourth Embodiment

In this embodiment, for the selected number of transmission streams, the set of sub-band precoding matrices is a set of precoding matrices where the number of non-zero antenna ports is 4, the non-zero antenna ports of the sub-band precoding matrices have a completely same position, and the first two antenna ports have a same relative phase relationship in each stream.

For example, the set of sub-band precoding matrices is a set of precoding matrices in any of Tables 8 to 12, and 18.

Fifth Embodiment

In this embodiment, for the selected number of transmission streams, the set of sub-band precoding matrices is a set of precoding matrices where the number of non-zero antenna ports is 4, the non-zero antenna ports of the sub-band precoding matrices have a completely same position, the first two antenna ports have a same relative phase relationship in each stream, and the last two antenna ports have a same relative phase relationship in each stream.

For example, the set of sub-band precoding matrices is a set of precoding matrices in any of Tables 14 to 17.

The tables showing the correspondence between the possible sub-band precoding matrix indication information for the sub-band part and the precoding matrices (or some sets of sub-band precoding matrices) will be given hereinafter.

In these tables, i represents an index number indicated by a second part in the precoding matrix indication information, and it starts from 0 or 1.

In these tables, a correspondence between a wideband indicator and the precoding matrices. In actual use, these tables are embedded into a larger table including the correspondence between the wideband indicator and the precoding matrices. TPMI represents an index number of the precoding matrix in the uplink codebook. A possible correspondence between the TPMI and the precoding matrix will be given as follows, and the uplink codebook is an uplink codebook in an NR system. In a possible embodiment of the present disclosures, each table is used to represent a set of precoding matrices, and the content of the precoding matrix indication information and the correspondence between the precoding matrix indication information and the precoding matrix may be different from those shown in the tables.

TABLE 1

| two antennae, with TPMI in Table 6.3.1.5-1 | |
| --- | --- |
| precoding indication information (sub-band part) i | TPMI |
| 0 | one stream: TPMI = 0 |
| 1 | one stream: TPMI = 1 |

TABLE 2

| two antennae, with TPMI in Table 6.3.1.5-1 | |
| --- | --- |
| precoding indication information (sub-band part) i | TPMI |
| 0 | one stream: TPMI = 2 |
| 1 | one stream: TPMI = 3 |
| 2 | one stream: TPMI = 4 |
| 3 | one stream: TPMI = 5 |

TABLE 3

| two antennae, with TPMI in Table 6.3.1.5-1 | |
| --- | --- |
| precoding indication information (sub-band part) | TPMI |
| 0 | one stream: TPMI = 0 |
| 1 | one stream: TPMI = 1 |
| 2 | one stream: TPMI = 2 |
| 3 | one stream: TPMI = 3 |
| 4 | one stream: TPMI = 4 |
| 5 | one stream: TPMI = 5 |

TABLE 4

| two antennae, with TPMI in Table 6.3.1.5-4 | |
| --- | --- |
| precoding indication information (sub-band part) | TPMI |
| 0 | two streams: TPMI = 0 |

TABLE 5

| two antennae, with TPMI in Table 6.3.1.5-4 | |
| --- | --- |
| precoding indication information (sub-band part) | TPMI |
| 0 | two streams: TPMI = 1 |
| 1 | two streams: TPMI = 2 |

TABLE 6

| two antennae, with TPMI in Table 6.3.1.5-4 | |
| --- | --- |
| precoding indication information (sub-band part) | TPMI |
| 0 | two streams: TPMI = 0 |
| 1 | two streams: TPMI = 1 |
| 2 | two streams: TPMI = 2 |

TABLE 7

| four antennae, with TPMI in Table 6.3.1.5-3 | |
| --- | --- |
| precoding indication information (sub-band part) | TPMI |
| 0 | one stream: TPMI = 0 |
| 1 | one stream: TPMI = 1 |
| 2 | one stream: TPMI = 2 |
| 3 | one stream: TPMI = 3 |

TABLE 8

| four antennae, with TPMI in Table 6.3.1.5-3 | |
| --- | --- |
| precoding indication information (sub-band part) | TPMI |
| 0 | one stream: TPMI = 4 |
| 1 | one stream: TPMI = 5 |
| 2 | one stream: TPMI = 6 |
| 3 | one stream: TPMI = 7 |

TABLE 9

| four antennae, with TPMI in Table 6.3.1.5-3 | |
| --- | --- |
| precoding indication information (sub-band part) | TPMI |
| 0 | one stream: TPMI = 8 |
| 1 | one stream: TPMI = 9 |
| 2 | one stream: TPMI = 10 |
| 3 | one stream: TPMI = 11 |

TABLE 10

| four antennae, with TPMI in Table 6.3.1.5-3 | |
| --- | --- |
| precoding indication information (sub-band part) | TPMI |
| 0 | one stream: TPMI = 12 |
| 1 | one stream: TPMI = 13 |
| 2 | one stream: TPMI = 14 |
| 3 | one stream: TPMI = 15 |

TABLE 11

| four antennae, with TPMI in Table 6.3.1.5-3 | |
| --- | --- |
| precoding indication information (sub-band part) | TPMI |
| 0 | one stream: TPMI = 16 |
| 1 | one stream: TPMI = 17 |
| 2 | one stream: TPMI = 18 |
| 3 | one stream: TPMI = 19 |

TABLE 12

| four antennae, with TPMI in Table 6.3.1.5-3 | |
| --- | --- |
| precoding indication information (sub-band part) | TPMI |
| 0 | one stream: TPMI = 20 |
| 1 | one stream: TPMI = 21 |
| 2 | one stream: TPMI = 22 |
| 3 | one stream: TPMI = 23 |

TABLE 13

| four antennae, with TPMI in Table 6.3.1.5-5 | |
| --- | --- |
| precoding indication information (sub-band part) | TPMI |
| 0 | two streams: TPMI = 0 |
| 1 | two streams: TPMI = 1 |
| 2 | two streams: TPMI = 2 |
| 3 | two streams: TPMI = 3 |
| 4 | two streams: TPMI = 4 |
| 5 | two streams: TPMI = 5 |

TABLE 14

| four antennae, with TPMI in Table 6.3.1.5-5 | |
| --- | --- |
| precoding indication information (sub-band part) | TPMI |
| 0 | two streams: TPMI = 6 |
| 1 | two streams: TPMI = 7 |

TABLE 15

| four antennae, with TPMI in Table 6.3.1.5-5 | |
| --- | --- |
| precoding indication information (sub-band part) | TPMI |
| 0 | two streams: TPMI = 8 |
| 1 | two streams: TPMI = 9 |

TABLE 16

| four antennae, with TPMI in Table 6.3.1.5-5 | |
| --- | --- |
| precoding indication information (sub-band part) | TPMI |
| 0 | two streams: TPMI = 10 |
| 1 | two streams: TPMI = 11 |

TABLE 17

| four antennae, with TPMI in Table 6.3.1.5-5 | |
| --- | --- |
| precoding indication information (sub-band part) | TPMI |
| 0 | two streams: TPMI = 12 |
| 1 | two streams: TPMI = 13 |

TABLE 18

| four antennae, with TPMI in Table 6.3.1.5-5 | |
| --- | --- |
| precoding indication information (sub-band part) | TPMI |
| 0 | two streams: TPMI = 6 |
| 1 | two streams: TPMI = 7 |
| 2 | two streams: TPMI = 8 |
| 3 | two streams: TPMI = 9 |
| 4 | two streams: TPMI = 10 |
| 5 | two streams: TPMI = 11 |
| 6 | two streams: TPMI = 12 |
| 7 | two streams: TPMI = 13 |

TABLE 19

| four antennae, with TPMI in Table 6.3.1.5-5 | |
| --- | --- |
| precoding indication information (sub-band part) | TPMI |
| 0 | two streams: TPMI = 14 |
| 1 | two streams: TPMI = 15 |
| 2 | two streams: TPMI = 16 |
| 3 | two streams: TPMI = 17 |
| 4 | two streams: TPMI = 18 |
| 5 | two streams: TPMI = 19 |
| 6 | two streams: TPMI = 20 |
| 7 | two streams: TPMI = 21 |

TABLE 20

| four antennae, with TPMI in Table 6.3.1.5-6 | |
| --- | --- |
| precoding indication information (sub-band part) | TPMI |
| 0 | three streams: TPMI = 0 |

TABLE 21

| four antennae, with TPMI in Table 6.3.1.5-6 | |
| --- | --- |
| precoding indication information (sub-band part) | TPMI |
| 0 | three streams: TPMI = 1 |
| 1 | three streams: TPMI = 2 |

TABLE 22

| four antennae, with TPMI in Table 6.3.1.5-6 | |
| --- | --- |
| precoding indication information (sub-band part) | TPMI |
| 0 | three streams: TPMI = 3 |
| 1 | three streams: TPMI = 4 |
| 2 | three streams: TPMI = 5 |
| 3 | three streams: TPMI = 6 |

TABLE 23

| four antennae, with TPMI in Table 6.3.1.5-7 | |
| --- | --- |
| precoding indication information (sub-band part) | TPMI |
| 0 | four streams: TPMI = 0 |

TABLE 24

| four antennae, with TPMI in Table 6.3.1.5-7 | |
| --- | --- |
| precoding indication information (sub-band part) | TPMI |
| 0 | four streams: TPMI = 1 |
| 1 | four streams: TPMI = 2 |

TABLE 25

| four antennae, with TPMI in Table 6.3.1.5-7 | |
| --- | --- |
| precoding indication information (sub-band part) | TPMI |
| 0 | four streams: TPMI = 3 |
| 1 | four streams: TPMI = 4 |
| 2 | four streams: TPMI = 5 |
| 3 | four streams: TPMI = 6 |

In an instance including both the wideband indicator and the sub-band indicator, the overhead of the wideband part is 3 bits, and the overhead of the sub-band precoding matrix indicator is 2 bits.

TABLE 26

| four antennae, with TPMI in Table 6.3.1.5-3 | | |
| --- | --- | --- |
| wideband part | precoding indication information (sub-band part) | TPMI |
| 0 | 0 | one stream: TPMI = 0 |
| | 1 | one stream: TPMI = 1 |
| | 2 | one stream: TPMI = 2 |
| | 3 | one stream: TPMI = 3 |
| 1 | 0 | one stream: TPMI = 4 |
| | 1 | one stream: TPMI = 5 |
| | 2 | one stream: TPMI = 6 |
| | 3 | one stream: TPMI = 7 |
| 2 | 0 | one stream: TPMI = 8 |
| | 1 | one stream: TPMI = 9 |
| | 2 | one stream: TPMI = 10 |
| | 3 | one stream: TPMI = 11 |
| 3 | 0 | one stream: TPMI = 15 |
| | 1 | one stream: TPMI = 16 |
| | 2 | one stream: TPMI = 17 |
| | 3 | one stream: TPMI = 18 |
| 4 | 0 | one stream: TPMI = 19 |
| | 1 | one stream: TPMI = 20 |
| | 2 | one stream: TPMI = 21 |
| | 3 | one stream: TPMI = 22 |

Instances of the uplink codebook adopted in the NR system will be given as follows.

TABLE 6.3.1.5-1

| Precoding matrix W for single-layer transmission using two antenna ports | |
| --- | --- |
| TPMI index | W (ordered from left to right in increasing order of TPMI index |
| 0-5 | $\frac{1}{\sqrt{2}}\begin{bmatrix}1\\0\end{bmatrix}$   $\frac{1}{\sqrt{2}}\begin{bmatrix}0\\1\end{bmatrix}$   $\frac{1}{\sqrt{2}}\begin{bmatrix}1\\1\end{bmatrix}$   $\frac{1}{\sqrt{2}}\begin{bmatrix}1\\-1\end{bmatrix}$   $\frac{1}{\sqrt{2}}\begin{bmatrix}1\\j\end{bmatrix}$   $\frac{1}{\sqrt{2}}\begin{bmatrix}1\\-j\end{bmatrix}$   — — |

TABLE 6.3.1.5-3

| TPMI index | W (ordered from left to right in increasing order of TPMI index) |
|---|---|
| 0-7 | $\frac{1}{2}\begin{bmatrix}1\\0\\0\\0\end{bmatrix}\quad \frac{1}{2}\begin{bmatrix}0\\1\\0\\0\end{bmatrix}\quad \frac{1}{2}\begin{bmatrix}0\\0\\1\\0\end{bmatrix}\quad \frac{1}{2}\begin{bmatrix}0\\0\\0\\1\end{bmatrix}\quad \frac{1}{2}\begin{bmatrix}1\\0\\1\\0\end{bmatrix}\quad \frac{1}{2}\begin{bmatrix}1\\0\\-1\\0\end{bmatrix}\quad \frac{1}{2}\begin{bmatrix}1\\0\\j\\0\end{bmatrix}\quad \frac{1}{2}\begin{bmatrix}1\\0\\-j\\0\end{bmatrix}$ |
| 8-15 | $\frac{1}{2}\begin{bmatrix}0\\1\\0\\1\end{bmatrix}\quad \frac{1}{2}\begin{bmatrix}0\\1\\0\\-1\end{bmatrix}\quad \frac{1}{2}\begin{bmatrix}0\\1\\0\\j\end{bmatrix}\quad \frac{1}{2}\begin{bmatrix}0\\1\\0\\-j\end{bmatrix}\quad \frac{1}{2}\begin{bmatrix}1\\1\\1\\1\end{bmatrix}\quad \frac{1}{2}\begin{bmatrix}1\\1\\j\\j\end{bmatrix}\quad \frac{1}{2}\begin{bmatrix}1\\1\\-1\\-1\end{bmatrix}\quad \frac{1}{2}\begin{bmatrix}1\\1\\-j\\-j\end{bmatrix}$ |
| 16-23 | $\frac{1}{2}\begin{bmatrix}1\\j\\1\\j\end{bmatrix}\quad \frac{1}{2}\begin{bmatrix}1\\j\\j\\-1\end{bmatrix}\quad \frac{1}{2}\begin{bmatrix}1\\j\\-1\\-j\end{bmatrix}\quad \frac{1}{2}\begin{bmatrix}1\\j\\-j\\1\end{bmatrix}\quad \frac{1}{2}\begin{bmatrix}1\\-1\\1\\-1\end{bmatrix}\quad \frac{1}{2}\begin{bmatrix}1\\-1\\j\\-j\end{bmatrix}\quad \frac{1}{2}\begin{bmatrix}1\\-1\\-1\\1\end{bmatrix}\quad \frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}\quad \frac{1}{2}\begin{bmatrix}1\\-j\\j\\1\end{bmatrix}\quad \frac{1}{2}\begin{bmatrix}1\\-j\\-1\\j\end{bmatrix}\quad \frac{1}{2}\begin{bmatrix}1\\-j\\-j\\-1\end{bmatrix}$  — — — — |

Precoding matrix W for single-layer transmission using four antenna ports with transform precoding disabled

TABLE 6.3.1.5-4

Precoding matrix W for two-layer transmission using two antenna ports with transform precoding disabled

| TPMI index | W (ordered from left to right in increasing order of TPMI index) |
|---|---|
| 0-2 | $\frac{1}{\sqrt{2}}\begin{bmatrix}1&0\\0&1\end{bmatrix}\qquad \frac{1}{2}\begin{bmatrix}1&1\\1&-1\end{bmatrix}\qquad \frac{1}{2}\begin{bmatrix}1&1\\j&-j\end{bmatrix}$ |

TABLE 6.3.1.5-5

Precoding matrix W for two-layer transmission using four antenna ports with transform precoding disabled

| TPMI index | W (ordered from left to right in increasing order of TPMI index) |
|---|---|
| 0-3 | $\frac{1}{2}\begin{bmatrix}1&0\\0&1\\0&0\\0&0\end{bmatrix}\quad \frac{1}{2}\begin{bmatrix}1&0\\0&0\\0&1\\0&0\end{bmatrix}\quad \frac{1}{2}\begin{bmatrix}1&0\\0&0\\0&0\\0&1\end{bmatrix}\quad \frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}\quad \frac{1}{2}\begin{bmatrix}0&0\\0&0\\1&0\\0&1\end{bmatrix}\quad \frac{1}{2}\begin{bmatrix}1&0\\0&1\\1&0\\0&-j\end{bmatrix}\quad \frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}\quad \frac{1}{2}\begin{bmatrix}1&0\\0&1\\-j&0\\0&-1\end{bmatrix}\quad \frac{1}{2}\begin{bmatrix}1&0\\0&1\\-1&0\\0&-j\end{bmatrix}\quad \frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}\quad \frac{1}{2}\begin{bmatrix}1&0\\0&1\\j&0\\0&-1\end{bmatrix}\quad \frac{1}{2\sqrt{2}}\begin{bmatrix}1&1\\1&1\\1&-1\\1&-1\end{bmatrix}\quad \frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}\quad \frac{1}{2\sqrt{2}}\begin{bmatrix}1&1\\j&j\\j&-j\\-1&1\end{bmatrix}\quad \frac{1}{2\sqrt{2}}\begin{bmatrix}1&1\\-1&-1\\1&-1\\-1&1\end{bmatrix}\quad \frac{1}{2\sqrt{2}}\begin{bmatrix}1&1\\-1&-1\\j&-j\\-j&j\end{bmatrix}$ |

TABLE 6.3.1.5-5-continued

|  | Precoding matrix W for two-layer transmission using four antenna ports with transform precoding disabled | | |
|---|---|---|---|
| TPMI index | W (ordered from left to right in increasing order of TPMI index) | | |

20-21

$$\frac{1}{2\sqrt{2}}\begin{bmatrix} 1 & 1 \\ -j & -j \\ 1 & -1 \\ -j & j \end{bmatrix} \quad \frac{1}{2\sqrt{2}}\begin{bmatrix} 1 & 1 \\ -j & -j \\ j & -j \\ 1 & -1 \end{bmatrix} \quad - \quad -$$

TABLE 6.3.1.5-6

|  | Precoding matrix W for three-layer transmission using four antenna ports with transform precoding disabled | | |
|---|---|---|---|
| TPMI index | W (ordered from left to right in increasing order of TPMI index) | | |

0-3

$$\frac{1}{2}\begin{bmatrix} 1 & 0 & 0 \\ 0 & 1 & 0 \\ 0 & 0 & 1 \\ 0 & 0 & 0 \end{bmatrix} \quad \frac{1}{2}\begin{bmatrix} 1 & 0 & 0 \\ 0 & 1 & 0 \\ 1 & 0 & 0 \\ 0 & 0 & 1 \end{bmatrix} \quad \frac{1}{2}\begin{bmatrix} 1 & 0 & 0 \\ 0 & 1 & 0 \\ -1 & 0 & 0 \\ 0 & 0 & 1 \end{bmatrix} \quad \frac{1}{2\sqrt{3}}\begin{bmatrix} 1 & 1 & 1 \\ 1 & -1 & 1 \\ 1 & 1 & -1 \\ 1 & -1 & -1 \end{bmatrix}$$

4-6

$$\frac{1}{2\sqrt{3}}\begin{bmatrix} 1 & 1 & 1 \\ 1 & -1 & 1 \\ j & j & -j \\ j & -j & -j \end{bmatrix} \quad \frac{1}{2\sqrt{3}}\begin{bmatrix} 1 & 1 & 1 \\ -1 & 1 & -1 \\ 1 & 1 & -1 \\ -1 & 1 & 1 \end{bmatrix} \quad \frac{1}{2\sqrt{3}}\begin{bmatrix} 1 & 1 & 1 \\ -1 & 1 & -1 \\ j & j & -j \\ -j & j & j \end{bmatrix} \quad -$$

TABLE 6.3.1.5-7

|  | Precoding matrix W for four-layer transmission using four antenna ports with transform precoding disabled | | |
|---|---|---|---|
| TPMI index | W (ordered from left to right in increasing order of TPMI index) | | |

0-3

$$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad \frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix} \quad \frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix} \quad \frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

4

$$\frac{1}{4}\begin{bmatrix} 1 & 1 & 1 & 1 \\ 1 & -1 & 1 & -1 \\ j & j & -j & -j \\ j & -j & -j & j \end{bmatrix} \quad - \quad - \quad -$$

In the embodiments of the present disclosure, the stream is also called as layer, and the number of transmission streams is also called as the number of transmission layers.

Based on a same inventive concept, the present disclosure further provides in some embodiments a base station, a UE, a precoding matrix indication apparatus, a precoding matrix determination apparatus, and a computer-readable storage medium. A principle for solving the problems by these devices is similar to that of the precoding matrix indication method and the precoding matrix determination method, so the implementation of these devices may refer to those of the methods, and thus will not be particularly further defined herein.

The technical solutions in the embodiments of the present disclosure will be implemented as follows.

As shown in FIG. 3, the present disclosure provides in some embodiments a base station, which includes a processor 300, a transceiver 310 and a memory 320. The processor 300 is configured to read a program stored in the memory 320, so as to: determine a set of sub-band precoding matrices, the set of sub-band precoding matrices being a sub-set in an uplink codebook of an uplink signal; determine sub-band information of precoding matrix indication information of the uplink signal in accordance with the set of sub-band precoding matrices, the sub-band information being used to indicate a sub-band precoding matrix that corresponds to each sub-band and is in the set of sub-band precoding matrices; and transmit the precoding matrix indication information including the sub-band information to a UE. The transceiver 310 is configured to receive and transmit data under the control of the processor 300.

During the implementation, the set of sub-band precoding matrices is a sub-set selected from the uplink codebook of the uplink signal in accordance with one or more of a codebook sub-set constraint, the number of transmission streams, a full power transmission mode of the uplink signal, the number of antenna ports of each precoding matrix, or a coherent transmission capability of the UE.

During the implementation, the set of sub-band precoding matrices meets one or more of the following conditions: that the sub-band precoding matrices have the same number of non-zero antenna ports; that the sub-band precoding matrices have completely same non-zero antenna ports; that first M antenna ports of the sub-band precoding matrices have a same relative phase relation; or that the non-zero antenna ports of the sub-band precoding matrices have same positions.

During the implementation, M is a value determined in advance, agreed through a protocol, indicated by the network side to the UE, or determined in accordance with a pre-agreed rule.

During the implementation, M is half of the number of antenna ports included in an SRS resource for determining transmission information of the uplink signal, and/or the uplink signal is a signal of a PUSCH and M has a different value when the number of antenna ports corresponding to the PUSCH is different.

During the implementation, the processor is further configured to read the program in the memory, so as to transmit a method for determining the set of sub-band precoding matrices to the UE, thereby to indicate the UE to determine the set of sub-band precoding matrices in accordance with the method.

During the implementation, the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports selected from the uplink codebook; or the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports and the number of transmission streams selected from the uplink codebook. The processor is further configured to read the program in the memory, so as to indicate the number of non-zero antenna ports to the UE.

During the implementation, an indication overhead of the sub-band information is a function of the number of all possible sub-band precoding matrices in the set of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

During the implementation, the sub-band information indicated by the precoding matrix indication information includes sub-band information of a sub-band whose sub-band information has not been indicated, and/or sub-band information of a sub-band whose sub-band precoding matrix has already been invalid.

During the implementation, the precoding matrix indication information further includes wideband information for the sub-band precoding matrix for each sub-band.

During the implementation, the wideband information is determined by the network side in accordance with the set of sub-band precoding matrices.

During the implementation, the wideband information includes indication information of the SRS resource and/or indication information of the number of transmission streams.

During the implementation, when the wideband information includes the indication information of the number of transmission streams, the set of sub-band precoding matrices is a set of sub-band precoding matrices corresponding to the number of transmission streams indicated by the wideband information.

During the implementation, the processor is further configured to read the program in the memory, so as to perform joint encoding on the wideband information and the sub-band information.

During the implementation, the joint encoding is performed on the wideband information and the sub-band information through one or more of: carrying the wideband information in sub-band information of one sub-band; determining, by the base station, sub-band information of one sub-band, and determining sub-band information of another sub-band in accordance with the wideband information and the sub-band information of the sub-band; or agreeing, by the base station with a UE side, sub-band information of one sub-band, and determining sub-band information of another sub-band in accordance with the wideband information and the sub-band information of the sub-band.

During the implementation, an indication overhead of the wideband information is a function of the number of all possible sets of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

During the implementation, the selected number of transmission streams is the number of transmission streams indicated by the network side and available for the UE during the uplink transmission.

In FIG. 3, bus architecture may include a number of buses and bridges connected to each other, so as to connect various circuits for one or more processors 300 and one or more memories 320. In addition, as is known in the art, the bus architecture may be used to connect any other circuits, such as a circuit for a peripheral device, a circuit for a voltage stabilizer and a power management circuit. A bus interface may be provided, and the transceiver 310 may consist of a plurality of elements, i.e., a transmitter and a receiver for communication with any other devices over a transmission medium. The processor 300 may take charge of managing the bus architecture as well as general processings. The memory 320 may store therein data for the operation of the processor 300.

The present disclosure further provides in some embodiments a precoding matrix indication apparatus, including: a set determination module configured to determine a set of sub-band precoding matrices, the set of sub-band precoding matrices being a sub-set in an uplink codebook of an uplink signal; a sub-band determination module configured to determine sub-band information of precoding matrix indication information of the uplink signal in accordance with the set of sub-band precoding matrices, the sub-band information being used to indicate a sub-band precoding matrix that corresponds to each sub-band and is in the set of sub-band precoding matrices; and a transmission module configured to transmit the precoding matrix indication information including the sub-band information to a UE.

The implementation of the precoding matrix indication apparatus may refer to that of the precoding matrix indication method mentioned hereinabove.

For ease of description, the precoding matrix indication apparatus includes various modules or units on the basis of its functions. It should be noted, the functions of the modules or units may be achieved in one or more software or hardware components.

Figure 4:
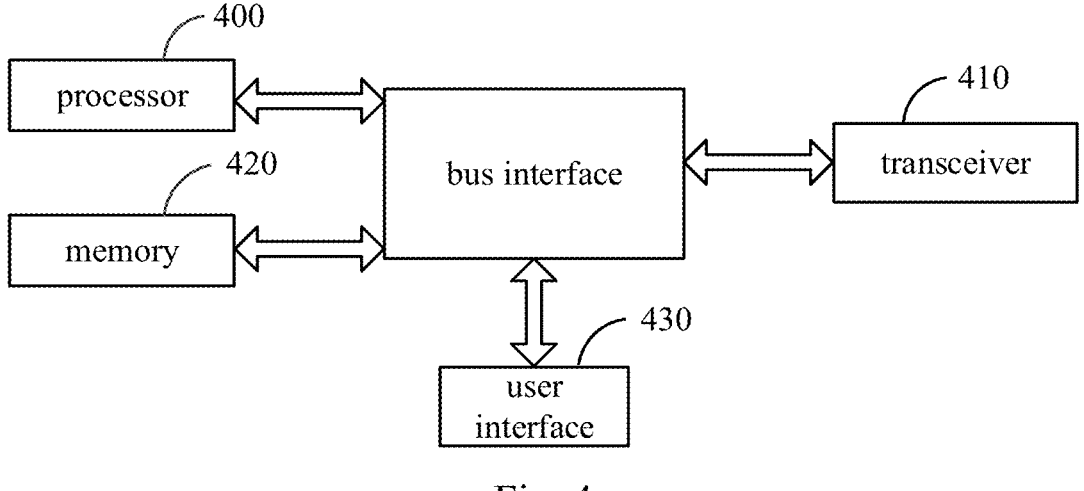
FIG. 4 is a schematic view showing a UE according to an embodiment of the present disclosure.

As shown in FIG. 4, the present disclosure further provides in some embodiments a UE, which includes a processor 400, a transceiver 410 and a memory 420. The processor 400 is configured to read a program in the memory 420, so as to: receive precoding matrix indication information including sub-band information of an uplink signal transmitted by a network side, the sub-band information indicated by the precoding matrix indication information being determined by the network side in accordance with a set of sub-band precoding matrices, the set of sub-band precoding matrices being a sub-set in an uplink codebook of the uplink signal, the sub-band information being used to indicate a sub-band precoding matrix that corresponds to each sub-band and is in the set of sub-band precoding matrices; determine the set of sub-band precoding matrices; and determine a sub-band precoding matrix for each sub-band in the set of sub-band precoding matrices in accordance with the sub-band information. The transceiver 410 is configured to receive and transmit data under the control of the processor 400.

During the implementation, the set of sub-band precoding matrices is determined from sub-sets selected from the uplink codebook of the uplink signal in accordance with one or more of a codebook sub-set constraint, the number of transmission streams, a full power transmission mode of the uplink signal, the number of antenna ports of each precoding matrix, or a coherent transmission capability of the UE.

During the implementation, the set of sub-band precoding matrices is determined in accordance with one or more of the following conditions: that the sub-band precoding matrices have the same number of non-zero antenna ports; that the sub-band precoding matrices have completely same non-zero antenna ports; that first M antenna ports of the sub-band precoding matrices have a same relative phase relation; or that the non-zero antenna ports of the sub-band precoding matrices have same positions.

During the implementation, M is a value determined in advance, agreed through a protocol, indicated by the network side to the UE, or determined in accordance with a pre-agreed rule.

During the implementation, M is half of the number of antenna ports included in an SRS resource for determining transmission information of the uplink signal, and/or the uplink signal is a signal of a PUSCH and M has a different value when the number of antenna ports corresponding to the PUSCH is different.

During the implementation, the processor is further configured to read the program in the memory, so as to receive a method for determining the set of sub-band precoding matrices transmitted by the network side, and determine the set of sub-band precoding matrices in accordance with the method.

During the implementation, the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports selected from the uplink codebook; or the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports and the number of transmission streams selected from the uplink codebook. The processor is further configured to read the program in the memory, so as to receive the number of non-zero antenna ports from the network side.

During the implementation, an indication overhead of the sub-band information is determined by the UE, and the indication overhead is a function of the number of all possible sub-band precoding matrices in the set of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

During the implementation, the sub-band information indicated by the precoding matrix indication information includes sub-band information of a sub-band whose sub-band information has not been indicated, and/or sub-band information of a sub-band whose sub-band precoding matrix has already been invalid.

During the implementation, the precoding matrix indication information further includes wideband information for the sub-band precoding matrix for each sub-band.

During the implementation, the set of sub-band precoding matrices is determined by the UE in accordance with the wideband information.

During the implementation, the wideband information includes indication information of the SRS resource and/or indication information of the number of transmission streams.

During the implementation, when the wideband information includes the indication information of the number of transmission streams, the set of sub-band precoding matrices is a set of sub-band precoding matrices corresponding to the number of transmission streams indicated by the wideband information.

During the implementation, the processor is further configured to read the program in the memory, so as to, when joint encoding is performed on the wideband information and the sub-band information, determine the wideband information and the sub-band information through one or more of: determining the wideband information in sub-band information of one sub-band; determining sub-band information of one sub-band, and determining sub-band information of another sub-band in accordance with the wideband information; or agreeing, by a UE side with the network side, sub-band information of one sub-band, and determining sub-band information of another sub-band in accordance with the wideband information.

During the implementation, an indication overhead of the wideband information is determined by the UE, and the indication overhead is a function of the number of all possible sets of sub-band precoding matrices when one or more of the following conditions are met: a selected codebook sub-band constraint, the selected number of transmission streams, a selected full power transmission mode of the uplink signal, the selected number of antenna ports, or the coherent transmission capability of the UE.

During the implementation, the selected number of transmission streams is the number of transmission streams indicated by the network side and available for the UE during the uplink transmission.

FIG. 4, bus architecture may include a number of buses and bridges connected to each other, so as to connect various circuits for one or more processors 400 and one or more memories 420. In addition, as is known in the art, the bus architecture may be used to connect any other circuits, such as a circuit for a peripheral device, a circuit for a voltage stabilizer and a power management circuit. A bus interface may be provided, and the transceiver 410 may consist of a plurality of elements, i.e., a transmitter and a receiver for communication with any other devices over a transmission medium. With respect to different UEs, a user interface 430 may also be provided for devices which are to be arranged inside or outside the UE, and these devices may include but not limited to a keypad, a display, a speaker, a microphone and a joystick.

The processor 400 may take charge of managing the bus architecture as well as general processings. The memory 420 may store therein data for the operation of the processor 400.

The present disclosure further provides in some embodiments a precoding matrix determination apparatus, which includes: a reception module configured to receive precoding matrix indication information including sub-band information of an uplink signal transmitted by a network side, the sub-band information indicated by the precoding matrix indication information being determined by the network side in accordance with a set of sub-band precoding matrices, the set of sub-band precoding matrices being a sub-set in an uplink codebook of the uplink signal, the sub-band information being used to indicate a sub-band precoding matrix that corresponds to each sub-band and is in the set of sub-band precoding matrices; a UE set determination module configured to determine the set of sub-band precoding matrices; and a UE sub-band determination module configured to determine a sub-band precoding matrix for each sub-band in the set of sub-band precoding matrices in accordance with the sub-band information.

The implementation of the precoding matrix determination apparatus may refer to that of the precoding matrix determination method mentioned hereinabove.

For ease of description, the precoding matrix indication apparatus includes various modules or units on the basis of its functions. It should be noted, the functions of the modules or units may be achieved in one or more software or hardware components.

The present disclosure further provides in some embodiments a computer-readable storage medium storing therein a computer program for implementing the above-mentioned precoding matrix indication method and/or precoding matrix determination method.

The implementation of the computer-readable storage medium may refer to that of the precoding matrix indication method and/or the precoding matrix determination method mentioned hereinabove.

In a word, according to the embodiments of the present disclosure, the network side device determines the set of sub-band precoding matrices, determines the sub-band part in the precoding matrix indication information of the uplink signal in accordance with the set of sub-band precoding matrices, and transmits the precoding matrix indication information to the UE, so that the UE determines the precoding matrix for the uplink signal at each sub-band.

In addition, the set of sub-band precoding matrices is a set of all precoding matrices in the uplink codebook that satisfy the second condition when the first parameter is given, and the relevant overhead is also given.

In the related art, there are currently no specific schemes about how to indicate, by the base station, the frequency selective precoding matrix (also called as sub-band precoding matrix) for the uplink signal and how to determine, by the UE, the precoding matrix for the uplink signal during the frequency selective precoding transmission. When the precoding matrix for each sub-band is indicated in the uplink codebook, a large overhead is required. In contrast, according to the sub-band precoding matrix indication scheme in the embodiments of the present disclosure, it is able to reduce the overhead for the sub-band precoding indication.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be appreciated that, units and steps described in the embodiments of the present disclosure are implemented in the form of electronic hardware, or a combination of a computer program and the electronic hardware. Whether or not these functions are executed by hardware or software depends on specific applications or design constraints of the technical solution. Different methods are adopted with respect to the specific applications so as to achieve the described functions, without departing from the scope of the present disclosure.

It should be further appreciated that, for convenience and clarification, operation procedures of the system, device and units described hereinabove refer to the corresponding procedures in the method embodiment, and thus will not be particularly defined herein.

It should be further appreciated that, the device and method are implemented in any other ways. For example, the embodiments for the apparatus is merely for illustrative purposes, and the modules or units are provided merely on the basis of their logic functions. During the actual application, some modules or units are combined together or integrated into another system. Alternatively, some functions of the module or units are omitted or not executed. In addition, the coupling connection, direct coupling connection or communication connection between the modules or units is implemented via interfaces, and the indirect coupling connection or communication connection between the modules or units is implemented in an electrical or mechanical form or in any other form.

The units are, or are not, physically separated from each other. The units for displaying are, or are not, physical units, i.e., they are arranged at an identical position, or distributed on a plurality of network elements. Parts or all of the units are selected in accordance with the practical need, so as to achieve the purpose of the present disclosure.

In addition, the functional units in the embodiments of the present disclosure are integrated into a processing unit, or the functional units exist independently, or two or more functional units are combined together.

In the case that the functional units are implemented in a software form and sold or used as a separate product, they are stored in a computer-readable medium. Based on this, the technical solutions of the present disclosure, partial or full, or parts of the technical solutions of the present disclosure contributing to the related art, appear in the form of software products, which are stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, all or parts of the steps in the method may be implemented by related hardware under the control of a computer program. The computer program may be stored in a computer-readable storage medium, and it may be executed so as to implement the steps in the above-mentioned method embodiments. The storage medium may be a magnetic disk, an optical disk, an ROM or an RAM It should be appreciated that, the embodiments of the present disclosure may be implemented by hardware, software, firmware, middleware, microcode or a combination thereof. For the hardware implementation, the processor may include one or more of an Application Specific Integrated Circuit (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

A person skilled in the art understands that various modifications and variations can be made without departing from the spirit and scope of the present disclosure. Thus, when these modifications and variations fall within the scope of the claims of the present disclosure and their equivalents, the present disclosure is also intended to include such modifications and variations.

What is claimed is:

1. A precoding matrix indication method, comprising:
determining, by a base station, a set of sub-band precoding matrices, the set of sub-band precoding matrices being a sub-set in an uplink codebook of an uplink signal;
determining, by the base station, sub-band information of precoding matrix indication information of the uplink signal in accordance with the set of sub-band precoding matrices, the sub-band information being used to indicate a sub-band precoding matrix that corresponds to a sub-band and is in the set of sub-band precoding matrices;
transmitting, by the base station, the precoding matrix indication information comprising the sub-band information to a User Equipment (UE); wherein the sub-band information is represented by an indication value in the precoding matrix indication information;
receiving, by the UE, the precoding matrix indication information comprising sub-band information;
determining, by the UE, the set of sub-band precoding matrices;
determining, by the UE in accordance with the sub-band information, the sub-band precoding matrix that is in the set of sub-band precoding matrices and corresponds to the sub-band;
generating, by the UE, a pre-coded uplink signal through applying the sub-band precoding matrix to the corresponding sub-band of the uplink signal, and transmitting, by the UE, the pre-coded uplink signal; and
receiving, by the base station from the UE, the pre-coded uplink signal;
wherein the set of sub-band precoding matrices is a sub-set selected from the uplink codebook of the uplink signal in accordance with one or more of following parameters:
a codebook sub-set constraint, a number of transmission streams, a full power transmission mode of the uplink signal, a number of antenna ports of a precoding matrix, or a coherent transmission capability of the UE;
the set of sub-band precoding matrices comprises one or more of the following:
the sub-band precoding matrices in the set having the same number of non-zero antenna ports;
the sub-band precoding matrices in the set having completely same non-zero antenna ports;
first M antenna ports of the sub-band precoding matrices in the set having a same relative phase relation; or
the non-zero antenna ports of the sub-band precoding matrices in the set having a same position;
M is a value determined in advance, agreed through a protocol, indicated by the base station to the UE, or determined in accordance with a pre-agreed rule.

2. The precoding matrix indication method according to claim 1, wherein M represents half of the number of antenna ports comprised in Sounding Reference Signal, SRS, resource for determining transmission information of the uplink signal, and/or the uplink signal is a signal of a Physical Uplink Shared Channel, PUSCH, and M has a different value when the number of antenna ports corresponding to the PUSCH is different.

3. The precoding matrix indication method according to claim 1, wherein the set of sub-band precoding matrices is a set consisting of all sub-band precoding matrices having a same number of non-zero antenna ports, and the all sub-band precoding matrices having the same number of non-zero antenna ports are among sub-band precoding matrices that correspond to a number of antenna ports selected from the uplink codebook; or the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports and the number of transmission streams selected from the uplink codebook, wherein the precoding matrix indication method further comprises: notifying, by the base station, the number of non-zero antenna ports to the UE.

4. The precoding matrix indication method according to claim 1, wherein the sub-band information indicated by the precoding matrix indication information comprises: sub-band information of a sub-band whose sub-band information has not been indicated, and/or sub-band information of a sub-band whose sub-band precoding matrix has already been invalid.

5. The precoding matrix indication method according to claim 1, wherein the precoding matrix indication information further comprises wideband information for the sub-band precoding matrix for a sub-band.

6. The precoding matrix indication method according to claim 1, further comprising: indicating, by the base station, a scheme for indicating the set of sub-band precoding matrices to the UE, to instruct the UE to determine the set of sub-band precoding matrices in accordance with the scheme.

7. A precoding matrix determination method, comprising: receiving, by a User Equipment (UE), precoding matrix indication information comprising sub-band information transmitted by a base station, the sub-band information indicated by the precoding matrix indication information of an uplink signal being determined by the base station in accordance with a set of sub-band precoding matrices, the set of sub-band precoding matrices being a sub-set in an uplink codebook of the uplink signal, the sub-band information being used to indicate a sub-band precoding matrix that corresponds to a sub-band and is in the set of sub-band precoding matrices; wherein the sub-band information is represented by an indication value in the precoding matrix indication information:

determining, by the UE, the set of sub-band precoding matrices;

determining, by the UE in accordance with the sub-band information, the sub-band precoding matrix that is in the set of sub-band precoding matrices and corresponds to the sub-band; and generating, by the UE, a pre-coded uplink signal through applying the sub-band precoding matrix to the corresponding sub-band of the uplink signal, and transmitting the pre-coded uplink signal;

wherein the set of sub-band precoding matrices is a sub-set selected from the uplink codebook of the uplink signal in accordance with one or more of following parameters:

a codebook sub-set constraint, a number of transmission streams, a full power transmission mode of the uplink signal, a number of antenna ports of a precoding matrix, or a coherent transmission capability of the UE;

the set of sub-band precoding matrices comprises one or more of the following: the sub-band precoding matrices in the set having the same number of non-zero antenna ports;

the sub-band precoding matrices in the set having completely same non-zero antenna ports;

first M antenna ports of the sub-band precoding matrices in the set having a same relative phase relation;

the non-zero antenna ports of the sub-band precoding matrices in the set having a same position;

M is a value determined in advance, agreed through a protocol, indicated by the base station to the UE, or determined in accordance with a pre-agreed rule.

8. The precoding matrix determination method according to claim 7, wherein M represents half of the number of antenna ports comprised in Sounding Reference Signal, SRS, resource for determining transmission information of the uplink signal, and/or the uplink signal is a signal of a Physical Uplink Shared Channel, PUSCH, and M has a different value when the number of antenna ports corresponding to the PUSCH is different.

9. The precoding matrix determination method according to claim 7, wherein the set of sub-band precoding matrices is a set consisting of all sub-band precoding matrices having a same number of non-zero antenna ports, and the all sub-band precoding matrices having the same number of non-zero antenna ports are among sub-band precoding matrices that correspond to a number of antenna ports selected from the uplink codebook; or the set of sub-band precoding matrices is a set consisting of all sub-band precoding matrices having the same number of non-zero antenna ports, and the all sub-band precoding matrices having the same number of non-zero antenna ports are among sub-band precoding matrices that correspond to the number of antenna ports and the number of transmission streams selected from the uplink codebook, wherein the precoding matrix determination method further comprises: receiving, by the UE, the number of non-zero antenna ports from the base station.

10. The precoding matrix determination method according to claim 7, wherein the sub-band information indicated by the precoding matrix indication information comprises: sub-band information of a sub-band whose sub-band information has not been indicated, and/or sub-band information of a sub-band whose sub-band precoding matrix has already been invalid.

11. The precoding matrix determination method according to claim 7, wherein the precoding matrix indication information further comprises wideband information for the sub-band precoding matrix for a sub-band.

12. The precoding matrix determination method according to claim 11, wherein the set of sub-band precoding matrices is determined by the UE in accordance with the wideband information.

13. The precoding matrix determination method according to claim 11, wherein the wideband information comprises indication information of the SRS resource and/or indication information of the number of transmission streams.

14. The precoding matrix determination method according to claim 11, further comprising: when joint encoding is performed on the wideband information and the sub-band information, determining the wideband information and the sub-band information through one or more of following methods: determining the wideband information from sub-band information of one sub-band; determining the wide-band information from sub-band information of one sub-band, and determining, by the base station, sub-band information of another sub-band in accordance with the wideband information; determining the bandwidth informa-tion from one sub-band agreed by a UE side with the base station, and determining sub-band information of another sub-band in accordance with the wideband information.

15. The precoding matrix determination method accord-ing to claim 11, wherein an indication overhead of the wideband information is determined by the UE, and the indication overhead of the wideband information is a func-tion of the number of all possible sets of sub-band precoding matrices when one or more of the following conditions are met:

a selected codebook sub-band constraint;
        a selected number of transmission streams; a selected full power transmission mode of the uplink signal;
        a selected number of antenna ports;
        the coherent transmission capability of the UE.

16. The precoding matrix indication method according to claim 7, further comprising: receiving, by the UE, a scheme for indicating the set of sub-band precoding matrices indi-cated by the base station, and determining, by the UE, the set of sub-band precoding matrices in accordance with the scheme.

17. A User Equipment (UE), comprising a processor, a memory and a transceiver, wherein the processor is config-ured to read a program in the memory to:

receive precoding matrix indication information compris-ing sub-band information transmitted by a base station, the sub-band information indicated by the precoding matrix indication information of an uplink signal being determined by the base station in accordance with a set of sub-band precoding matrices, the set of sub-band precoding matrices being a sub-set in an uplink code-book of the uplink signal, the sub-band information being used to indicate a sub-band precoding matrix that corresponds to a sub-band and is in the set of sub-band precoding matrices;
    wherein the sub-band information is represented by an indication value in the precoding matrix indication information;

determine the set of sub-band precoding matrices;
        determine, in accordance with the sub-band infor-mation, the sub-band precoding matrix that is in the set of sub-band precoding matrices and corre-sponds to the sub-band; and
    generate a pre-coded uplink signa through applying the sub-band precoding matrix to the corresponding sub-band of the uplink signal I, and transmit the pre-coded uplink signal;
    the set of sub-band precoding matrices is a sub-set selected from the uplink codebook of the uplink signal in accordance with one or more of following parameters:
    a codebook sub-set constraint, a number of transmis-sion streams, a full power transmission mode of the uplink signal, a number of antenna ports of a pre-coding matrix, or a coherent transmission capability of the UE;
    the transceiver is configured to receive and transmit data under the control of the processor;
    the set of sub-band precoding matrices comprises one or more of the following:
    the sub-band precoding matrices in the set having the same number of non-zero antenna ports;
        the sub-band precoding matrices in the set having completely same non-zero antenna ports;
    first M antenna ports of the sub-band precoding matri-ces in the set having a same relative phase relation; or
    the non-zero antenna ports of the sub-band precoding matrices in the set having have a same position;
    M is a value determined in advance, agreed through a protocol, indicated by the base station to the UE, or determined in accordance with a pre-agreed rule.

18. The UE according to claim 17, wherein the sub-band information indicated by the precoding matrix indication information comprises: sub-band information of a sub-band whose sub-band information has not been indicated, and/or sub-band information of a sub-band whose sub-band pre-coding matrix has already been invalid.

19. The UE according to claim 17, wherein the precoding matrix indication information further comprises wideband information for the sub-band precoding matrix for a sub-band.

\* \* \* \* \*